(12) United States Patent
Tian et al.

(10) Patent No.: US 12,399,193 B2
(45) Date of Patent: Aug. 26, 2025

(54) SYSTEMS, DEVICES, AND METHODS FOR COMBINED CELL PROCESSES

(71) Applicant: Cellares Corporation, South San Francisco, CA (US)

(72) Inventors: Isabel Tian, Sunnyvale, CA (US); Wilson Wai Toy, San Francisco, CA (US)

(73) Assignee: Cellares Corporation, South San Francisco, CA (US)

(*) Notice: Subject to any disclaimer, the term of this patent is extended or adjusted under 35 U.S.C. 154(b) by 0 days.

(21) Appl. No.: 18/652,602

(22) Filed: May 1, 2024

(65) Prior Publication Data

US 2024/0369586 A1 Nov. 7, 2024

Related U.S. Application Data

(60) Provisional application No. 63/464,386, filed on May 5, 2023.

(51) Int. Cl.
  *G01N 35/04* (2006.01)
  *B01L 3/00* (2006.01)
  *G01N 35/00* (2006.01)
  *G01N 1/30* (2006.01)

(52) U.S. Cl.
  CPC .............. *G01N 35/04* (2013.01); *B01L 3/502* (2013.01); *G01N 1/30* (2013.01); *G01N 2035/00495* (2013.01); *G01N 2035/0429* (2013.01)

(58) Field of Classification Search
  CPC ............ G01N 35/04; G01N 1/30; G01N 2035/00495; G01N 2035/0429; B01L 3/502
  See application file for complete search history.

(56) References Cited

U.S. PATENT DOCUMENTS

| | | | |
|---|---|---|---|
| 3,728,227 A | 4/1973 | Elson et al. |
| 4,234,023 A | 11/1980 | Sogi et al. |
| 4,696,902 A | 9/1987 | Bisconte |
| 4,839,292 A | 6/1989 | Cremonese |

(Continued)

FOREIGN PATENT DOCUMENTS

| CN | 104203333 A | 12/2014 |
|---|---|---|
| CN | 108660060 A | 10/2018 |

(Continued)

OTHER PUBLICATIONS

ChargePoint (2021). Aseptic split butterfly valve 10-6 sterility assurance, located at https://www.thechargepoint.com/products/aseptic-split-butterfly-valve-10-6-sterility-assurance/, 2 total pages.

(Continued)

*Primary Examiner* — John McGuirk
(74) *Attorney, Agent, or Firm* — Cooley LLP

(57) ABSTRACT

The present disclosure relates to systems, devices, and methods for spinoculation and counterflow centrifugal elutriation. In an embodiment, the present disclosure relates to a cartridge in an automated system, comprising a liquid transfer bus, a module fluidically coupled to the liquid transfer bus, the module comprising two sub-modules, each configured to perform separate cell processing steps, and at least one selector valve configured to direct fluid to at least one of the sub-modules.

24 Claims, 15 Drawing Sheets

(56) References Cited

U.S. PATENT DOCUMENTS

| | | |
|---|---|---|
| 4,911,833 A | 3/1990 | Schoendorfer et al. |
| 5,058,619 A | 10/1991 | Zheng |
| 5,656,491 A | 8/1997 | Cassani et al. |
| 6,374,684 B1 * | 4/2002 | Dority .................... B01L 3/502 73/864.81 |
| 6,649,419 B1 | 11/2003 | Anderson |
| 6,891,182 B2 | 5/2005 | Watari et al. |
| 7,521,224 B2 | 4/2009 | Johnson et al. |
| 7,550,287 B2 | 6/2009 | Hibino et al. |
| 7,745,209 B2 | 6/2010 | Martin et al. |
| 7,816,128 B2 | 10/2010 | Nakashima et al. |
| 8,158,426 B2 | 4/2012 | Wilson et al. |
| 8,158,427 B2 | 4/2012 | Wilson et al. |
| 8,168,432 B2 | 5/2012 | Wilson et al. |
| 8,273,572 B2 | 9/2012 | Martin et al. |
| 8,415,144 B2 | 4/2013 | Wilson et al. |
| 8,440,458 B2 | 5/2013 | Zijlstra et al. |
| 8,470,589 B2 | 6/2013 | Martin et al. |
| 8,492,140 B2 | 7/2013 | Smith et al. |
| 8,546,142 B2 | 10/2013 | Martin et al. |
| 8,697,443 B2 | 4/2014 | Wilson et al. |
| 8,727,132 B2 | 5/2014 | Miltenyi et al. |
| 8,809,044 B2 | 8/2014 | Wilson |
| 8,846,399 B2 | 9/2014 | Martin et al. |
| 8,956,860 B2 | 2/2015 | Vera et al. |
| 9,040,290 B2 | 5/2015 | Martin et al. |
| 9,045,721 B2 | 6/2015 | Martin et al. |
| 9,080,149 B2 | 7/2015 | Bosio et al. |
| 9,255,243 B2 | 2/2016 | Wilson et al. |
| 9,279,099 B2 | 3/2016 | Okano et al. |
| 9,290,730 B2 | 3/2016 | Martin et al. |
| 9,410,114 B2 | 8/2016 | Wilson et al. |
| 9,441,192 B2 | 9/2016 | Wilson et al. |
| 9,499,780 B2 | 11/2016 | Smith et al. |
| 9,534,195 B2 | 1/2017 | Smith et al. |
| 9,556,485 B2 | 1/2017 | Lin et al. |
| 9,567,565 B2 | 2/2017 | Vera et al. |
| 9,597,355 B2 | 3/2017 | Magnant |
| 9,625,463 B2 | 4/2017 | Miltenyi et al. |
| 9,701,932 B2 | 7/2017 | Smith et al. |
| 9,732,317 B2 | 8/2017 | Wilson |
| 9,783,768 B2 | 10/2017 | Larcher et al. |
| 9,845,451 B2 | 12/2017 | Martin et al. |
| 10,047,342 B2 | 8/2018 | Eibl et al. |
| 10,053,663 B2 | 8/2018 | Kabaha et al. |
| 10,119,970 B2 | 11/2018 | Miltenyi et al. |
| 10,131,876 B2 | 11/2018 | Kaiser et al. |
| 10,253,316 B2 | 4/2019 | Masquelier et al. |
| 10,294,658 B2 | 5/2019 | Scannon et al. |
| 10,323,258 B2 | 6/2019 | Bernate et al. |
| 10,329,559 B1 | 6/2019 | Masquelier et al. |
| 10,385,307 B2 | 8/2019 | Rowley et al. |
| 10,421,959 B1 | 9/2019 | Masquelier et al. |
| 10,508,288 B1 | 12/2019 | Bernate et al. |
| 10,519,437 B1 | 12/2019 | Masquelier et al. |
| 10,533,156 B2 | 1/2020 | Vera et al. |
| 10,584,333 B1 | 3/2020 | Masquelier et al. |
| 10,584,334 B1 | 3/2020 | Masquelier et al. |
| 10,584,354 B2 | 3/2020 | Wilson |
| 10,588,994 B2 | 3/2020 | Kawamura et al. |
| 10,620,212 B2 | 4/2020 | Miltenyi et al. |
| 10,689,669 B1 | 6/2020 | Feldman et al. |
| 10,705,090 B2 | 7/2020 | Miltenyi et al. |
| 10,705,091 B2 | 7/2020 | Miltenyi et al. |
| 10,723,986 B2 | 7/2020 | Smith et al. |
| 10,724,043 B2 | 7/2020 | Sixto et al. |
| 10,844,338 B1 | 11/2020 | Smith et al. |
| 11,161,111 B2 | 11/2021 | Kabaha et al. |
| 11,198,845 B2 | 12/2021 | Parietti et al. |
| 11,371,018 B2 | 6/2022 | Shi et al. |
| 11,376,587 B2 | 7/2022 | Thakkar et al. |
| 11,447,745 B2 | 9/2022 | Shi et al. |
| 11,613,725 B2 | 3/2023 | Wilson et al. |
| 11,701,654 B2 | 7/2023 | Azersky et al. |
| 11,786,896 B2 | 10/2023 | Thakkar et al. |
| 11,826,756 B2 | 11/2023 | Azersky et al. |
| 11,872,557 B2 | 1/2024 | Biz et al. |
| 12,157,119 B2 | 12/2024 | Gerlinghaus et al. |
| 12,180,453 B2 | 12/2024 | Chang et al. |
| 2002/0146817 A1 | 10/2002 | Cannon et al. |
| 2003/0030272 A1 | 2/2003 | Johnson et al. |
| 2004/0121454 A1 | 6/2004 | Jury et al. |
| 2005/0070018 A1 | 3/2005 | Johnson et al. |
| 2005/0186671 A1 | 8/2005 | Cannon et al. |
| 2005/0260743 A1 | 11/2005 | Drake et al. |
| 2006/0194193 A1 | 8/2006 | Tsuruta et al. |
| 2006/0257999 A1 | 11/2006 | Chang et al. |
| 2007/0185472 A1 | 8/2007 | Baumfalk et al. |
| 2008/0057568 A1 | 3/2008 | Kan et al. |
| 2008/0176318 A1 | 7/2008 | Wilson et al. |
| 2009/0042281 A1 | 2/2009 | Chang et al. |
| 2009/0053799 A1 | 2/2009 | Chang-Yen et al. |
| 2009/0247417 A1 | 10/2009 | Haas et al. |
| 2010/0130732 A1 * | 5/2010 | Chung .................... G01N 21/07 536/25.41 |
| 2010/0151571 A1 | 6/2010 | Vukasinovic et al. |
| 2011/0003380 A1 | 1/2011 | Miltenyi et al. |
| 2011/0223064 A1 | 9/2011 | Katsumi et al. |
| 2011/0229927 A1 | 9/2011 | Larsen et al. |
| 2011/0262896 A1 | 10/2011 | Blecka et al. |
| 2012/0138156 A1 | 6/2012 | Hofman et al. |
| 2012/0293338 A1 | 11/2012 | Chaffey et al. |
| 2013/0078624 A1 | 3/2013 | Holmes et al. |
| 2013/0115617 A1 | 5/2013 | Wilson |
| 2014/0309795 A1 | 10/2014 | Norton et al. |
| 2015/0307829 A1 | 10/2015 | Dedry et al. |
| 2015/0336096 A1 | 11/2015 | Smith et al. |
| 2016/0060680 A1 | 3/2016 | Buse et al. |
| 2016/0161516 A1 | 6/2016 | Fritchie et al. |
| 2016/0208216 A1 | 7/2016 | Vera et al. |
| 2016/0244714 A1 | 8/2016 | Spuhler et al. |
| 2016/0303563 A1 | 10/2016 | Granier et al. |
| 2016/0320381 A1 | 11/2016 | Holmes et al. |
| 2016/0320422 A1 | 11/2016 | Fritchie et al. |
| 2017/0058527 A1 | 3/2017 | Williams et al. |
| 2017/0307502 A1 | 10/2017 | Mason et al. |
| 2017/0313977 A1 | 11/2017 | Wilson |
| 2017/0321226 A1 | 11/2017 | Gill et al. |
| 2017/0348525 A1 | 12/2017 | Sano et al. |
| 2017/0362554 A1 | 12/2017 | Martin et al. |
| 2018/0031592 A1 | 2/2018 | Dority |
| 2018/0051243 A1 | 2/2018 | Hogan et al. |
| 2018/0078935 A1 | 3/2018 | Hung et al. |
| 2018/0196918 A1 | 7/2018 | Sadowski et al. |
| 2019/0144826 A1 | 5/2019 | Leen et al. |
| 2019/0212233 A1 | 7/2019 | Jovanovich et al. |
| 2019/0264176 A1 | 8/2019 | Leen et al. |
| 2019/0275519 A1 | 9/2019 | Castillo et al. |
| 2019/0292510 A1 | 9/2019 | Tandon et al. |
| 2019/0293673 A1 * | 9/2019 | Wescott .................... G01N 1/4077 |
| 2019/0316120 A1 | 10/2019 | Masquelier et al. |
| 2019/0330579 A1 | 10/2019 | Guenat et al. |
| 2019/0345444 A1 | 11/2019 | Rosenberg et al. |
| 2020/0009557 A1 | 1/2020 | Frigard et al. |
| 2020/0025782 A1 | 1/2020 | Ahlfors |
| 2020/0048599 A1 | 2/2020 | Firouzi et al. |
| 2020/0095550 A1 | 3/2020 | Vera et al. |
| 2020/0159198 A1 | 5/2020 | Kapre et al. |
| 2020/0224147 A1 * | 7/2020 | Rogers .................... C12M 23/42 |
| 2020/0283713 A1 | 9/2020 | Ball et al. |
| 2020/0292552 A1 | 9/2020 | Miltenyi et al. |
| 2020/0353004 A1 | 11/2020 | Nowak et al. |
| 2020/0368411 A1 | 11/2020 | Camisani et al. |
| 2020/0399578 A1 | 12/2020 | Corso et al. |
| 2020/0406221 A1 | 12/2020 | Dabrowski et al. |
| 2021/0001339 A1 | 1/2021 | Liu et al. |
| 2021/0032583 A1 | 2/2021 | Smith et al. |
| 2021/0035655 A1 | 2/2021 | Tanouchi et al. |
| 2021/0047668 A1 | 2/2021 | Dabrowski et al. |
| 2021/0079344 A1 | 3/2021 | Bosio et al. |
| 2021/0147807 A1 | 5/2021 | Lickert et al. |
| 2021/0253997 A1 | 8/2021 | Wilson |
| 2021/0269755 A1 | 9/2021 | Smith et al. |
| 2021/0283565 A1 | 9/2021 | Gerlinghaus et al. |

(56) References Cited

U.S. PATENT DOCUMENTS

| | | |
|---|---|---|
| 2021/0284948 A1 | 9/2021 | Hauwaerts et al. |
| 2021/0301239 A1 | 9/2021 | Natsume et al. |
| 2021/0324318 A1 | 10/2021 | Parietti et al. |
| 2021/0354104 A1 | 11/2021 | Pesch et al. |
| 2022/0002652 A1 | 1/2022 | Patrick et al. |
| 2022/0003796 A1 | 1/2022 | Ahlfors |
| 2022/0047862 A1 | 2/2022 | Chang et al. |
| 2022/0121181 A1 | 4/2022 | Sobalvarro et al. |
| 2022/0143610 A1 | 5/2022 | Biz et al. |
| 2022/0150650 A1 | 5/2022 | Rucker |
| 2022/0259546 A1 | 8/2022 | Blanchard |
| 2022/0282199 A1 | 9/2022 | Vann |
| 2022/0325219 A1 | 10/2022 | Parietti et al. |
| 2022/0325240 A1 | 10/2022 | Mcfarland et al. |
| 2022/0347683 A1 | 11/2022 | Thakkar et al. |
| 2023/0051840 A1 | 2/2023 | Kelso et al. |
| 2023/0149922 A1 | 5/2023 | Thakkar et al. |
| 2023/0321650 A1 | 10/2023 | Azersky et al. |
| 2023/0415154 A1 | 12/2023 | Pesch et al. |
| 2023/0415155 A1 | 12/2023 | Biz et al. |
| 2024/0165613 A1 | 5/2024 | Azersky et al. |
| 2024/0254426 A1 | 8/2024 | Elpel et al. |
| 2024/0255537 A1 | 8/2024 | Malleo et al. |
| 2024/0279585 A1 | 8/2024 | Griffin et al. |
| 2024/0279588 A1 | 8/2024 | Malleo et al. |
| 2024/0318116 A1 | 9/2024 | Chang et al. |
| 2024/0326043 A1 | 10/2024 | Gerlinghaus et al. |
| 2024/0377420 A1 | 11/2024 | Cesarek |
| 2024/0390897 A1 | 11/2024 | Azersky et al. |
| 2024/0390898 A1 | 11/2024 | Azersky et al. |
| 2024/0399365 A1 | 12/2024 | Biz et al. |
| 2024/0402206 A1 | 12/2024 | Boppart et al. |
| 2025/0002837 A1 | 1/2025 | Bharat |
| 2025/0059492 A1 | 2/2025 | Beban et al. |
| 2025/0065331 A1 | 2/2025 | Malleo et al. |
| 2025/0066708 A1 | 2/2025 | Burkeen et al. |
| 2025/0066709 A1 | 2/2025 | Grout et al. |

FOREIGN PATENT DOCUMENTS

| | | | |
|---|---|---|---|
| EP | 0246912 | A2 | 11/1987 |
| EP | 0991389 | A1 | 4/2000 |
| EP | 0824380 | B1 | 1/2002 |
| EP | 3134512 | B1 | 1/2019 |
| EP | 2809449 | B1 | 10/2019 |
| EP | 3359294 | B1 | 5/2020 |
| EP | 3928867 | A1 | 12/2021 |
| GB | 2268187 | A | 1/1994 |
| JP | 2007325586 | A | 12/2007 |
| KR | 20130018286 | A | 2/2013 |
| KR | 20220131302 | A | 9/2022 |
| WO | WO-9320440 | A1 | 10/1993 |
| WO | WO-2006102416 | A2 | 9/2006 |
| WO | WO-2006112870 | A1 | 10/2006 |
| WO | WO-2006118282 | A1 | 11/2006 |
| WO | WO-2007139742 | A1 | 12/2007 |
| WO | WO-2009072003 | A2 | 6/2009 |
| WO | WO-2017041051 | A1 | 3/2017 |
| WO | WO-2017123663 | A1 | 7/2017 |
| WO | WO-2018015561 | A1 | 1/2018 |
| WO | WO-2018102471 | A1 | 6/2018 |
| WO | WO-2020009700 | A1 | 1/2020 |
| WO | WO-2020014264 | A1 | 1/2020 |
| WO | WO-2021168368 | A1 | 8/2021 |
| WO | WO-2021183687 | A2 | 9/2021 |
| WO | WO-2021212124 | A1 | 10/2021 |
| WO | WO-2024112702 | A1 | 5/2024 |
| WO | WO-2024152008 | A1 | 7/2024 |
| WO | WO-2024197093 | A2 | 9/2024 |
| WO | WO-2024206703 | A1 | 10/2024 |
| WO | WO-2025038974 | A1 | 2/2025 |
| WO | WO-2025041046 | A1 | 2/2025 |
| WO | WO-2025041047 | A1 | 2/2025 |
| WO | WO-2025041064 | A2 | 2/2025 |

OTHER PUBLICATIONS

CPC (2014). "6 traits of non-spill: How quick disconnect couplings evolved for low-pressure fluid handling," White Paper 8004, 4 total pages.
CPC (2014). "How single-use connections advance aseptic processing: Increased process flexibility and reliability, reduced costs," White Paper 7004, 6 total pages.
CPC (2018). Comparison Guide: Tube Welders and Aseptic Connectors, Technical Guide 7009, 3 total pages.
EMD Millipore (2015). "Lynx® S2S Connector—Low temperature compatibility (-80"C)," 4 total pages.
Final Office Action mailed on Apr. 28, 2022, for U.S. Appl. No. 17/198,134, filed Mar. 10, 2021, 11 pages.
Final Office Action mailed on Apr. 28, 2022, for U.S. Appl. No. 17/331,554, filed May 26, 2021, 16 pages.
Final Office Action mailed on Jul. 31, 2023, for U.S. Appl. No. 17/331,554, filed May 26, 2021, 19 pages.
Final Office Action mailed on Mar. 31, 2023, for U.S. Appl. No. 17/579,478, filed Jan. 19, 2022, 8 pages.
Garcia et al., "Microfluidic Screening of Electric Fields for Electroporation" Sci Rep. Feb. 19, 2016; 6:21238. pp. 1-11.
Genetic Engineering & Biotechnology News (2006). "Thermal welding for sterile connections," located at https://www.genengnews.com/magazine/47/thermal-welding-for-sterile-connections/, 5 total pages.
International Search Report and Written Opinion for International Application No. PCT/US2023/080593 dated Mar. 21, 2024, 12 pages.
International Search Report mailed on Oct. 13, 2021, for PCT Application No. PCT/US2021/021773, filed on Mar. 10, 2021, 13 pages.
Jain, S. et al. (2011). "The complete automation of cell culture: improvements for high-throughput and high-content screening," J. Biomol. Screen 16:932-939.
Kato, R. et al. (2010). "A Compact, Automated Cell Culture System for Clinical Scale Cell Expansion from Primary Tissues," Tissue Engineering: Part C 16:947-956.
Kempner, M.E. and Felder, R.A., "A review of cell culture automation". JALA: Journal of the Association for Laboratory Automation (Apr. 2002); 7(2): 56-62.
Kino-Oka, M. et al. (2005). "Bioreactor Design for Successive Culture of Anchorage-Dependent Cells Operated in an Automated Manner," Tissue Engineering 11:535-545.
Knoll, A. et al. (2004). "Flexible automation of cell culture and tissue engineering tasks," Biotechnol. Prog. 20:1825-1835.
Lutkemeyer, D. et al. (2000). "First steps in robot automation of sampling and sample management during cultivation of mammalian cells in pilot scale," Biotechnol. Prog. 16:822-828.
MEDInstill (2021). Intact™ Connectors, located at https://www.medinstill.com/intactconnectors.php, 1 total page.
Millipore® (2020). "Technical Brief—Choosing the right sterile connector based on design and sterility test results," 4 total pages.
Millipore Sigma (2020). "Lynx® CDR Connectors," Datasheet, 4 total pages.
Millipore Sigma (2021). Lynx® CDR Connectors, located at https://www.emdmillipore.com/US/en/product/Lynx-CDR-Connectors,MM_NF-C188801, 2 total pages.
Non Final Office Action for U.S. Appl. No. 17/579,478 mailed on Dec. 22, 2022, 7 pages.
Non-Final Office Action for U.S. Appl. No. 17/198,134, dated Jun. 26, 2023, 15 pages.
Non-Final Office Action for U.S. Appl. No. 17/331,554 dated Apr. 24, 2024, 17 pages.
Non-Final Office Action mailed on Dec. 3, 2021, for U.S. Appl. No. 17/331,556, filed May 26, 2021, 9 pages.
Non-Final Office Action mailed on Feb. 3, 2022, for U.S. Appl. No. 17/198,134, filed Mar. 10, 2021, 5 pages.
Non-Final Office Action mailed on Mar. 16, 2023, for U.S. Appl. No. 17/331,554, filed May 26, 2021, 16 pages.
Non-Final Office Action mailed on Oct. 28, 2021, for U.S. Appl. No. 17/331,554, filed May 26, 2021, 11 pages.

(56) References Cited

OTHER PUBLICATIONS

Non-Final Office Action mailed on Oct. 6, 2021, for U.S. Appl. No. 17/198,134, filed Mar. 10, 2021, 7 pages.
Non-Final Office Action mailed on Sep. 13, 2023, for U.S. Appl. No. 18/141,329, filed Apr. 28, 2023, 7 pages.
Notice of Allowance for U.S. Appl. No. 17/198,134 dated Apr. 11, 2024, 9 pages.
Notice of Allowance for U.S. Appl. No. 17/992,784, dated Mar. 22, 2023, 7 pages.
Notice of Allowance mailed on Jul. 18, 2023, for U.S. Appl. No. 17/849,422, filed Jun. 24, 2022, 8 pages.
Notice of Allowance mailed on Jul. 25, 2023, for U.S. Appl. No. 17/579,478, filed Jan. 19, 2022, 8 pages.
Notice of Allowance mailed on Jun. 8, 2023, for U.S. Appl. No. 17/849,422, filed Jun. 24, 2022, 8 pages.
Notice of Allowance mailed on Mar. 1, 2022, for U.S. Appl. No. 17/331,556, filed May 26, 2021, 8 pages.
Notice of Allowance mailed on Oct. 4, 2023, for U.S. Appl. No. 18/141,329, filed Apr. 28, 2023, 8 pages.
Qu, B., et al., "Droplet Electroporation in Microfluidics for Efficient Cell Transformation with or without Cell Wall Removal," Lab Chip, 2012, vol. 12, pp. 4483-4488.
Saint Gobain (2017). "Pure-Fit® SC—Secure aseptic connections," Brochure, 5 total pages.
Sartorius Stedim Biotech (2011). "Opta® SFT," 4 total pages.
Schwartz C., "Optimizing Cell Separation with Beckman Coulter's Centrifugal Elutriation System," Beckmann Coulter Life Sciences (2014) 6 total pages.
SeriesLock™ (2021). Features and Specifications, located at https://serieslock.com/, 5 total pages.
Shi, Y. et al. (1992). "Performance of Mammalian Cell Culture Bioreactor with a New Impeller Design," Biotechnology and Bioengineering 40:260-270.
Steris (2018). "A compilation of material compatibilities with vaporized hydrogen peroxide," 2 total pages.
Steris (2018). "Sterility assurance levels (SALS): Irradiation," 3 total pages.
Steris (2020). "Overview of sterilization technology comparison," 1 total page.
Strahlendorf, K.A. et al. (2009). "Bio Pharm International—A review of sterile connectors," vol. 2009 Supplement, Issue 8, located at https://www.biopharminternational.com/view/review-sterile-connectors, 9 total pages.
Written Opinion of the International Searching Authority mailed on Oct. 13, 2021, for PCT Application No. PCT/US2021/021773, filed on Mar. 10, 2021, 20 pages.
Final Office Action for U.S. Appl. No. 17/331,554 mailed Aug. 29, 2024, 18 pages.
International Search Report and Written Opinion for Application No. PCT/US2024/025064 mailed Sep. 6, 2024, 17 pages.
International Search Report and Written Opinion for PCT Application No. PCT/US2024/011486 dated May 24, 2024, 12 pages.
International Search Report and Written Opinion for PCT Application No. PCT/US2024/022079 mailed Sep. 12, 2024, 25 pages.
International Search Report and Written Opinion for PCT Application No. PCT/US2024/032062 mailed Sep. 6, 2024, 15 pages.
Invitation to Pay Additional Fees for International Application No. PCT/US2024/022079 dated Jul. 17, 2024, 19 pages.
Invitation to Pay Additional fees for International Application No. PCT/US2024/025064, mailed Jul. 16, 2024, 12 pages.
Non-Final Office Action for U.S. Appl. No. 18/244,051 mailed Oct. 9, 2024, 10 pages.
Non-Final Office Action for U.S. Appl. No. 18/731,095 mailed Aug. 8, 2024, 24 pages.
Non-Final Office Action for U.S. Appl. No. 18/799,963 mailed Sep. 30, 2024, 9 pages.
Non-Final Office Action mailed on May 14, 2024, for U.S. Appl. No. 18/611,632, filed Mar. 20, 2024, 13 pages.
Notice of Allowance (Corrected) mailed on Sep. 5, 2024, for U.S. Appl. No. 18/611,632, filed Mar. 20, 2024, 6 pages.
Notice of Allowance for U.S. Appl. No. 18/611,632 mailed Aug. 26, 2024, 9 pages.
Notice of Allowance for U.S. Appl. No. 18/810,388 mailed on Oct. 9, 2024, 9 pages.
Pharma Japan, "Astellas Set to Cut Development Time with Cell Culture Robot, Eyes 4 Billion Yen Profit per Product" Aug. 9, 2023, 3 pages.
U.S. Appl. No. 18/807,699, filed Aug. 16, 2024, by Beban et al.
U.S. Appl. No. 29/898,923, filed Aug. 2, 2024, by Gerlinghaus et al.
U.S. Appl. No. 18/611,632, filed Mar. 20, 2024, by Chang et al.
U.S. Appl. No. 18/638,658, filed Apr. 17, 2024, by Cesarek.
U.S. Appl. No. 18/731,095, filed May 31, 2024, by Boppart et al.
U.S. Appl. No. 18/759,602, filed Jun. 28, 2024, by Thakkar et al.
Final Office Action for U.S. Appl. No. 18/799,963 mailed Jan. 30, 2025, 10 pages.
Final Office Action for U.S. Appl. No. 18/810,386 mailed on Mar. 28, 2025, 8 pages.
International Search Report and Written Opinion for International Application No. PCT/IB2024/058106 mailed Jan. 21, 2025, 13 pages.
International Search Report and Written Opinion for International Application No. PCT/IB2024/058148 mailed Mar. 3, 2025, 21 pages.
International Search Report and Written Opinion for PCT Application No. PCT/IB2024/058105 mailed Dec. 16, 2024, 12 pages.
International Search Report and Written Opinion for PCT Application No. PCT/US2024/020809 mailed Mar. 24, 2025, 19 pages.
International Search Report and Written Opinion for PCT Application No. PCT/US2024/042795 mailed Dec. 16, 2024, 11 pages.
Invitation to Pay Additional fees for International Application No. PCT/IB2024/058148, mailed Jan. 2, 2025, 13 pages.
Invitation to Pay Additional fees for International Application No. PCT/US2024/020809, mailed Jan. 27, 2025, 17 pages.
Non-Final Office Action for U.S. Appl. No. 18/792,358 mailed on Nov. 6, 2024, 5 pages.
Non-Final Office Action for U.S. Appl. No. 18/810,386 mailed Nov. 18, 2024, 8 pages.
Non-Final Office Action for U.S. Appl. No. 18/988,628 mailed Mar. 3, 2025, 19 pages.
Notice of Allowance for U.S. Appl. No. 17/331,554 mailed Mar. 5, 2025, 8 pages.
Notice of Allowance for U.S. Appl. No. 18/487,884 mailed Feb. 26, 2025, 8 pages.
Notice of Allowance for U.S. Appl. No. 18/792,358 mailed on Mar. 3, 2025, 8 pages.
Notice of Allowance for U.S. Appl. No. 18/792,360 mailed Mar. 4, 2025, 9 pages.
Notice of Allowance for U.S. Appl. No. 18/792,360 mailed on Jan. 29, 2025, 9 pages.
Notice of Allowance for U.S. Appl. No. 18/810,388 mailed Jan. 21, 2025, 8 pages.
Notice of allowance for U.S. Appl. No. 18/811,490 mailed Feb. 26, 2025, 8 pages.
Notice of Allowance for U.S. Appl. No. 18/811,490 mailed on Dec. 12, 2024, 8 pages.
U.S. Appl. No. 18/988,628, filed Dec. 19, 2024, by Marchiando et al.

* cited by examiner

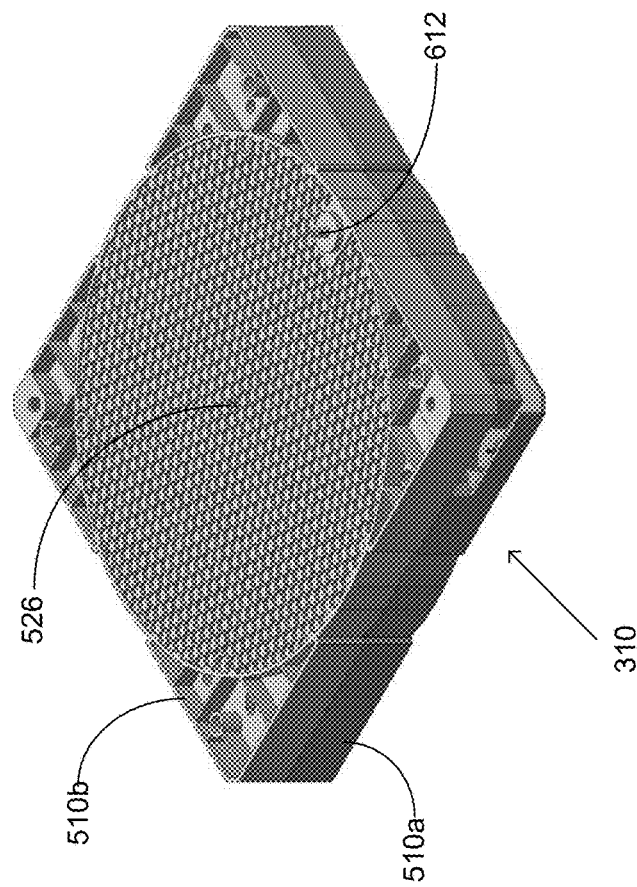
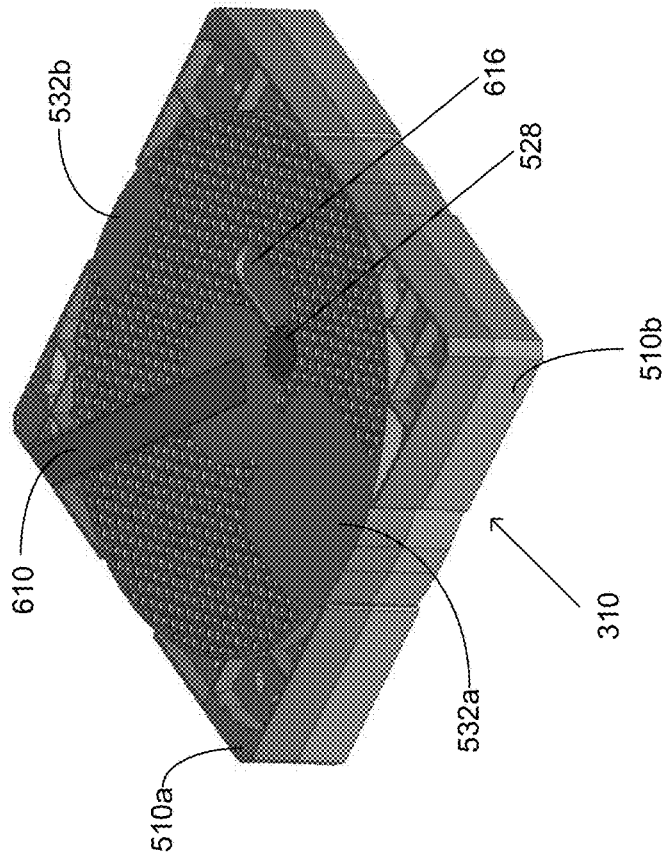
FIG. 6A
FIG. 6B

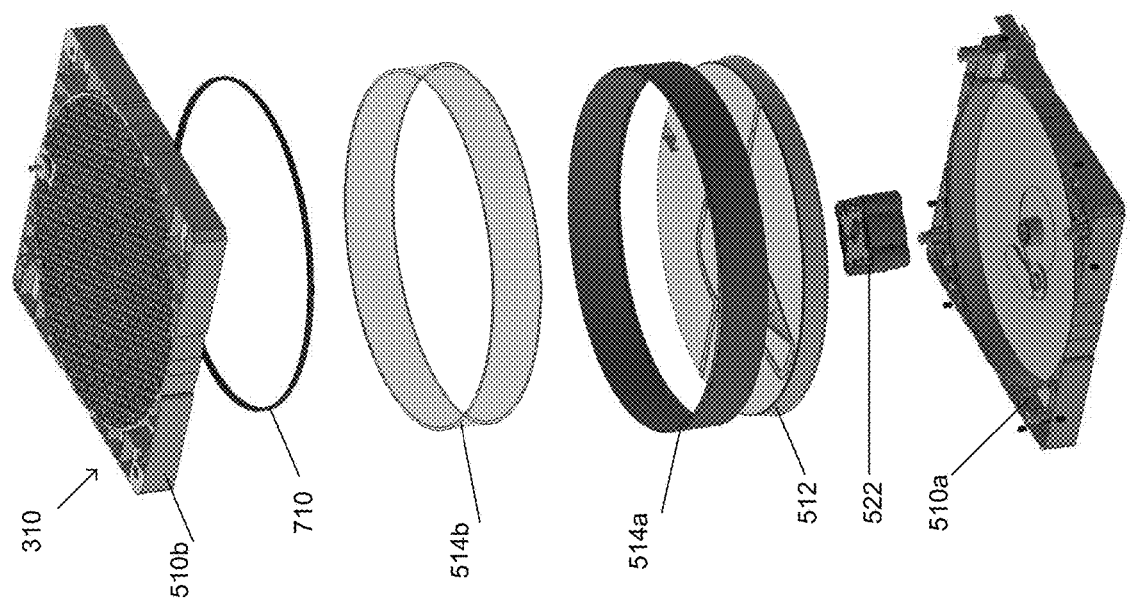
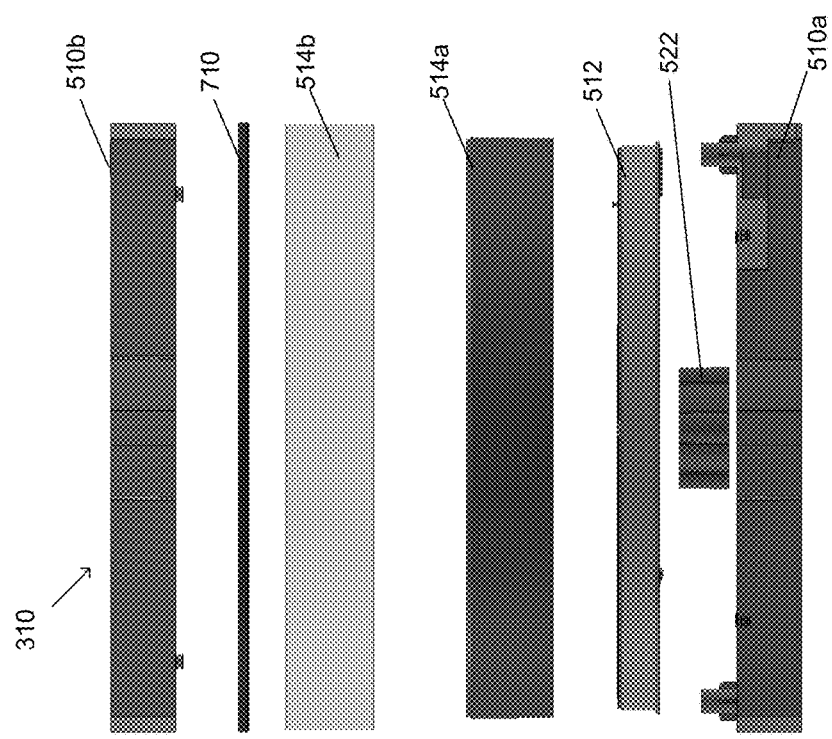

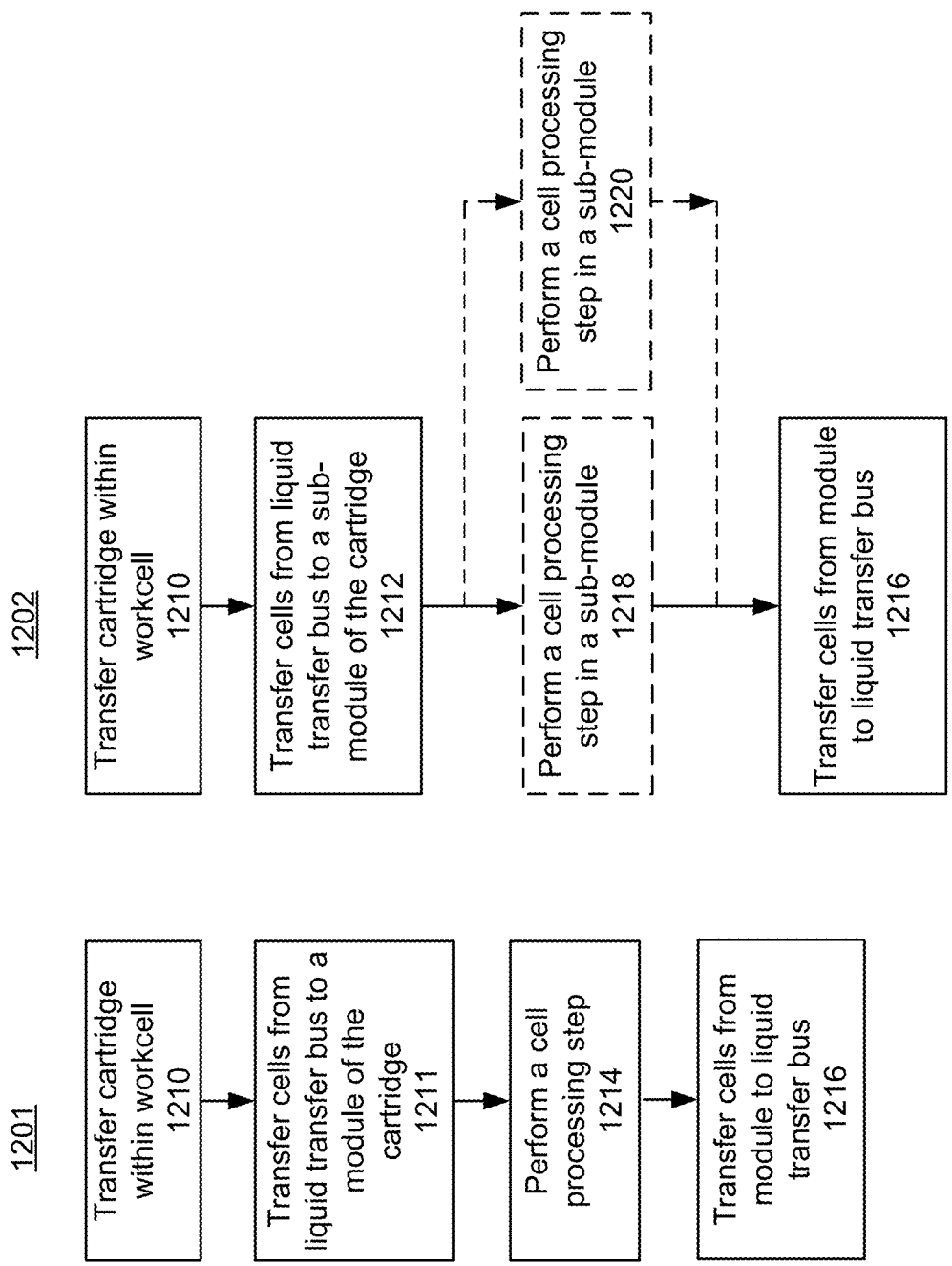

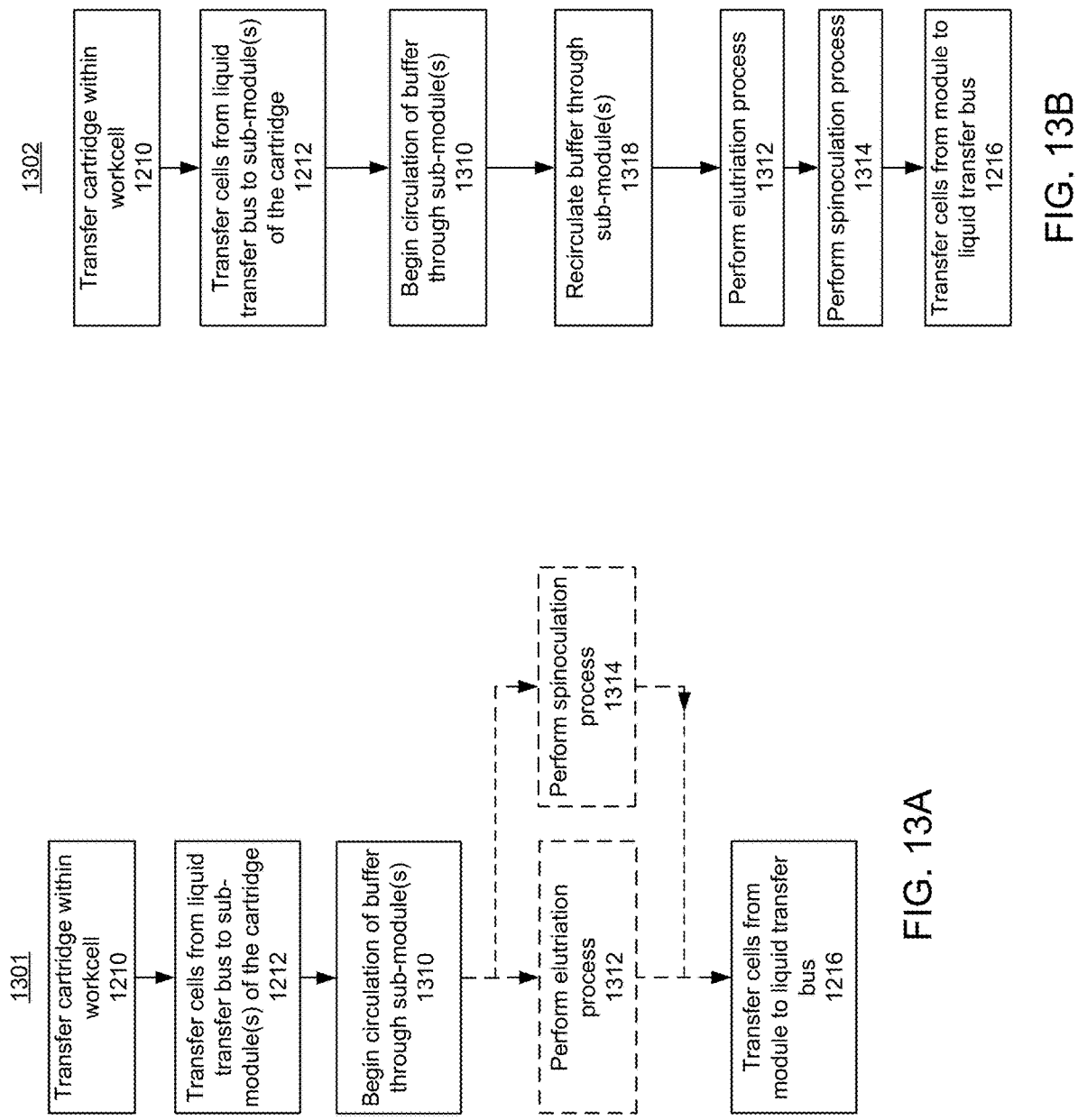

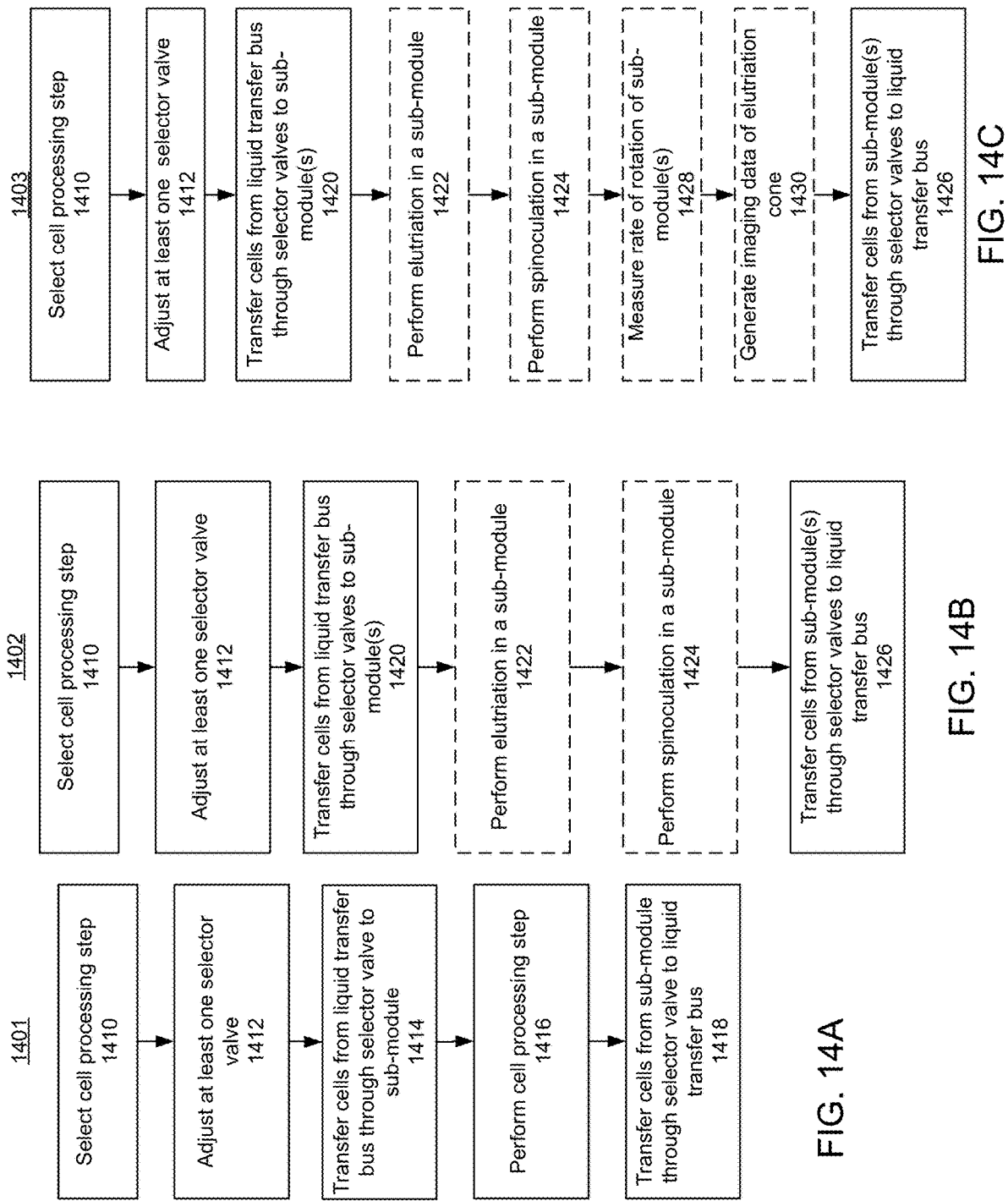

SYSTEMS, DEVICES, AND METHODS FOR COMBINED CELL PROCESSES

CROSS REFERENCE TO RELATED APPLICATIONS

This application claims priority to U.S. Provisional Patent Application No. 63/464,386, filed May 5, 2023, the contents of which are hereby incorporated in their entirety by this reference.

TECHNICAL FIELD

The present disclosure relates to systems, devices, and methods for multiple cell processes, for example, spinoculation and elutriation within a cell processing system.

BACKGROUND

Multiple cell processes may be performed on cells during cell-processing. For example, Applicant has developed an elutriation process that separates cells from a fluid based on the size and/or density of the cells and fluid. The elutriation process can include, for example, a counterflow centrifugal elutriation. This elutriation process is typically performed by rotating a fluid container containing the cells at a high rate. Spinoculation on the other hand, binds together cells of different types, such as cells and viral vectors, though the process also requires rotating a fluid container containing the cells at a high rate. Each of these cell processes typically requires separate components, such as motors, fluid containers, and fluid pathways in order to effectively manage the various workflow complexities, such as one process taking longer than another process, or the requirement that one process be completed before another process. Other complexities include the fact that some cell processes require significant volumes of supplementary fluids, which may produce significant waste upon completion of the cell processing. Other cell processes may be preferably performed without the use of supplementary fluids. Additionally, the space required to house the components required to perform the cell processes may be significant. These workflow complexities and housing requirements may be compounded when performing cell processing at a high volume.

Accordingly, additional systems and methods for performing elutriation and spinoculation are desirable, particularly those that may help ameliorate some of the complexities discussed above.

SUMMARY

The present disclosure relates generally to systems, devices, and methods for combined elutriation and spinoculation within an automated cell processing system. In general, the elutriation and spinoculation devices disclosed herein may reside within a cartridge that is used in a cell processing workcell. In some embodiments, the elutriation process comprises a counterflow centrifugal elutriation. In some variations, the cartridge comprises a liquid transfer bus and a module fluidically connected to the liquid transfer bus. The module may comprise two sub-modules, and at least one selector valve configured to direct fluid to at least one of the sub-modules. The two sub-modules may comprise an elutriation sub-module and a spinoculation sub-module. In some variations, at least one selector valve is adjustable to direct fluid to an elutriation chamber of the elutriation sub-module. In some variations, at least one selector valve is adjustable to direct fluid to a spinoculation chamber of the spinoculation sub-module. The at least one selector valve may also be adjustable to direct fluid to an elutriation chamber of the elutriation sub-module and a spinoculation chamber of the spinoculation sub-module in series.

The modules described herein may also comprise a rotor, and in variations where the module has an elutriation sub-module and a spinoculation sub-module, the sub-modules may share the rotor. The module may also comprise a magnetic hub for connecting to a corresponding instrument with a cell processing workcell. The elutriation sub-module and spinoculation sub-module of the module may share the magnetic hub. The elutriation sub-module and spinoculation sub-module may be enclosed within a housing. In some variations, the housing comprises at least one window. In some variations, the elutriation sub-module and spinoculation sub-module share a seal. The seal may comprise a first fluid opening and a second fluid opening.

Methods of elutriation and spinoculation are also described herein. In some variations, the methods comprise transferring a cartridge having cells therein into a cell processing workcell to couple the cartridge to a corresponding instrument of the cell processing workcell, transferring cells from a liquid transfer bus of the cartridge to a module of the cartridge, the module comprising two sub-modules, performing a cell processing step within a sub-module while the cartridge is coupled to the corresponding instrument, and transferring cells from the module to the liquid transfer bus. In some variations, the methods comprise flowing a buffer through at least one sub-module while performing at least one cell processing step. In some variations, the methods comprise measuring the rate of rotation of a rotor of the module using a sensor. In some variations, the methods comprise generating image data of an elutriation sub-module of the module using a sensor.

Additional embodiments, features, and advantages of the invention will be apparent from the following detailed description and through practice of the invention.

BRIEF DESCRIPTION OF THE DRAWINGS

FIG. 6A and FIG. 6B are renderings of a perspective view of an illustrative module of a cartridge.

FIG. 7A and FIG. 7B are renderings of an exploded view of an illustrative module of a cartridge.

FIG. 12A and FIG. 12B are flowcharts of illustrative variations of cell processing.

FIG. 13A and FIG. 13B are flowcharts of illustrative variations of cell processing.

FIG. 14A, FIG. 14B, and FIG. 14C are flowcharts of illustrative variations of cell processing.

DETAILED DESCRIPTION

Figure 1:
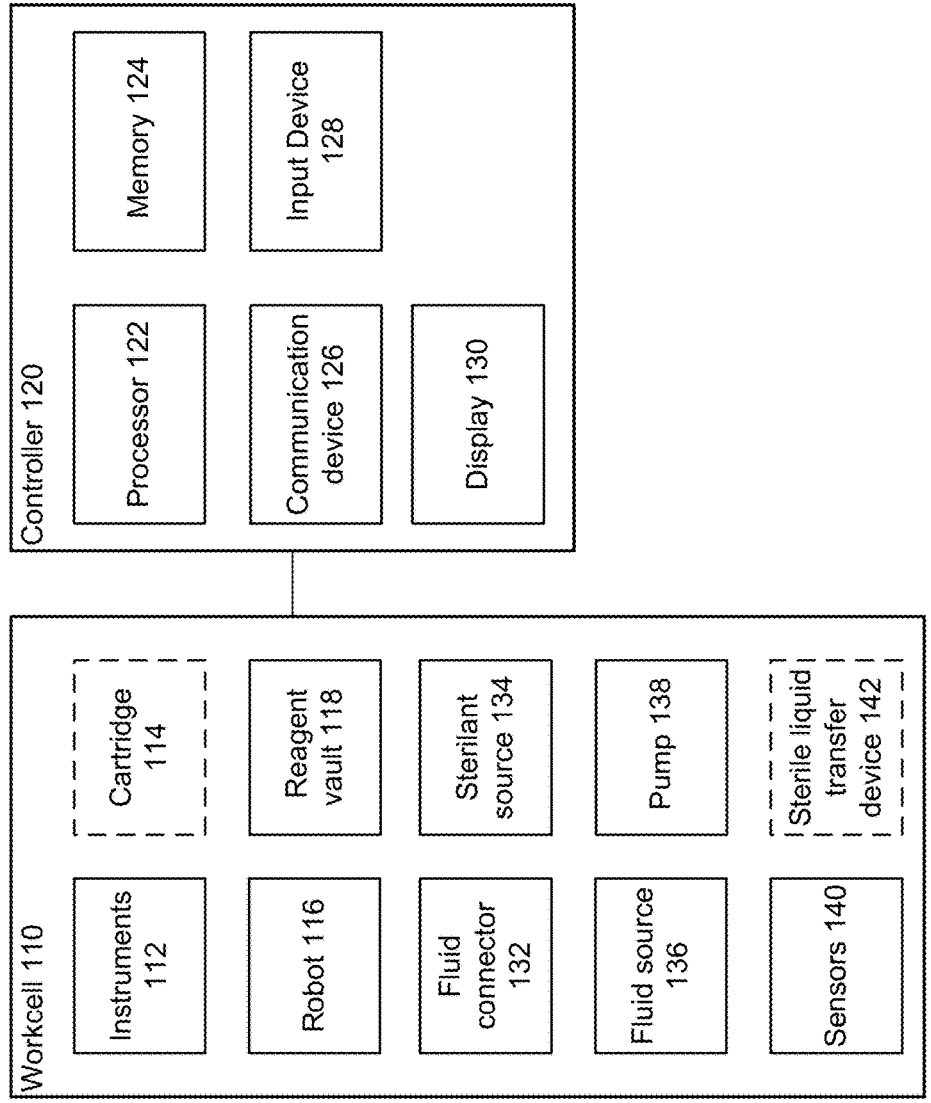
FIG. 1 is a block diagram of an illustrative variation of a cell processing system.

Devices, systems, and methods for processing cells are described herein. Multiple cell processes, or cell processing steps, may be performed on cells during cell-processing. Elutriation, such as counterflow centrifugal elutriation, separates cells from a fluid based on the size and/or density of the cells and fluid. The elutriation process is typically performed by rotating a fluid container containing the cells at a high rate. The elutriation process may remove red blood cells from an apheresis product. In a typical elutriation process, a buffer may be combined with the apheresis product while spinning the fluid container. The buffer may continuously flow through the fluid container to ensure a seal of the fluid container maintains its efficacy. A spinoculation process binds together cells of different types, such as cells and viral vectors. Spinoculation may enhance the transduction efficiency of viral vectors. The spinoculation process is typically performed by rotating a fluid container containing the cells at a high rate, which causes cells within the fluid to collect along a sidewall of a spinoculation chamber. In a typical spinoculation process, a buffer may not need to continuously flow through the fluid container to perform the spinoculation. However, a fluid may still need to flow through a seal of the fluid container to maintain the seal's efficacy.

Disclosed herein are devices, systems, and methods for performing multiple cell processing steps. The disclosed devices, systems, and methods may be used with a wide range of cell volumes, and in some variations, the devices, systems, and methods disclosed herein utilize multiple fluid modules and/or sensors to assist with accuracy and efficacy.

As described throughout, the cell processing methods, devices, and systems may involve moving a cartridge containing a cell product between a plurality of instruments inside a workcell. One or more instruments may be configured to interface with a cartridge to perform cell processing steps. In some variations, a plurality of cell processing steps may be performed within a single cartridge. For example, a robotic arm may be configured to move a cartridge between instruments, each instrument configured to perform a different cell processing step when coupled to a corresponding module within the cartridge. The cartridge may comprise any number of modules, such as a bioreactor module, a counterflow centrifugal elutriation (CCE) module, a magnetic cell sorter module, an electroporation module, a sorting module (e.g., fluorescence activated cell sorting (FACS) module), a spinoculation module, an acoustic flow cell module, a microfluidic enrichment module, and/or combinations thereof, and the like. In some embodiments, the workcell may process two or more cartridges in parallel. For example, the workcell may comprise a plurality of openings, slots, or bays, wherein each bay is configured to interface with a cartridge, such that multiple bays within the workcell may be in use at any given time. The cell processing systems described herein may reduce operator intervention and increase throughput by automating cartridge movement between instruments using a robot. However, in some embodiments, the cartridge may be moved between instruments manually. Moreover, the automated cell processing system may facilitate sterile liquid transfers between the cartridge and instruments or other components of the system such as a fluid connector (e.g., sterile liquid transfer port), reagent vault, a second cartridge, a sampling vessel e.g., sterile liquid transfer device, combinations thereof, and the like.

I. Cell Processing System

An illustrative cell processing system for use with the devices, systems, and methods is shown in FIG. 1. Shown there is a block diagram of a cell processing system 100 comprising a workcell 110 and controller 120. The workcell 110 may comprise one or more of an instrument 112, a robot 116 (e.g., robotic arm), a reagent vault 118, a fluid connector 132, a sterilant source 129, a fluid source 136, a pump 138, and a sensor 140. A cartridge 114 and a sterile liquid transfer device 142, part of the cell processing system 100, may be used within the workcell 110. The controller 120 may comprise one or more of a processor 122, a memory 124, a communication device 126, an input device 128, and a display 130.

The workcell 110 may comprise a fully, or at least partially, enclosed housing inside which one or more cell processing steps are performed in a fully, or at least partially, automated process. In some variations, the workcell may be an open system lacking an enclosure, which may be configured for use in a clean room, a biosafety cabinet, or other sterile location. The cartridge 114 may be moved using the robot 116 to reduce manual labor in the cell processing steps, and sterile liquid transfers into and out of the cartridge may also be performed in a fully or partially automated process. For example, one or more fluids may be stored in a sterile liquid transfer device 142. In some variations, the sterile liquid transfer device is a portable consumable that may be moved within the system 100. The sterile liquid transfer devices and fluid connectors described herein may help enable the transfer of fluids in an automated, sterile, and metered manner for automating cell therapy manufacturing.

In some variations, the robot 116 is configured to move cartridges 114 between different instruments to perform a predetermined sequence of cell processing steps. In this way, multiple cartridges 114 may be processed in parallel, as different steps of the cell processing sequence may be performed at the same time on different cartridges.

A fluid connector 132 may be coupled between two or more cartridges 114 to transfer a cell product and/or fluid between the cartridges 114. Furthermore, a fluid connector 132 may be coupled between any set of fluid-carrying components of the system 100 (e.g., cartridge 114, reagent vault 118, fluid source 136, sterile liquid transfer device 142, fluid conduit, container, vessel, etc.). For example, a first fluid connector may be coupled between a first cartridge and a sterile liquid transfer device, and a second fluid connector may be coupled between the sterile liquid transfer device and a second cartridge.

Any suitable cell processing may be performed using the systems and devices described herein, and may include steps such as separating, combining, growing, enriching, selecting, sorting, expanding, activating, transducing, electroporating, washing, and the like. In some variations, a method of performing a cell process includes transferring a cartridge containing a cell product to an instrument within a workcell, transferring cells from a liquid transfer bus of the cartridge to a module of the cartridge, performing a cell process step within the module, and transferring cells from the module to the liquid transfer bus.

Figure 2A:
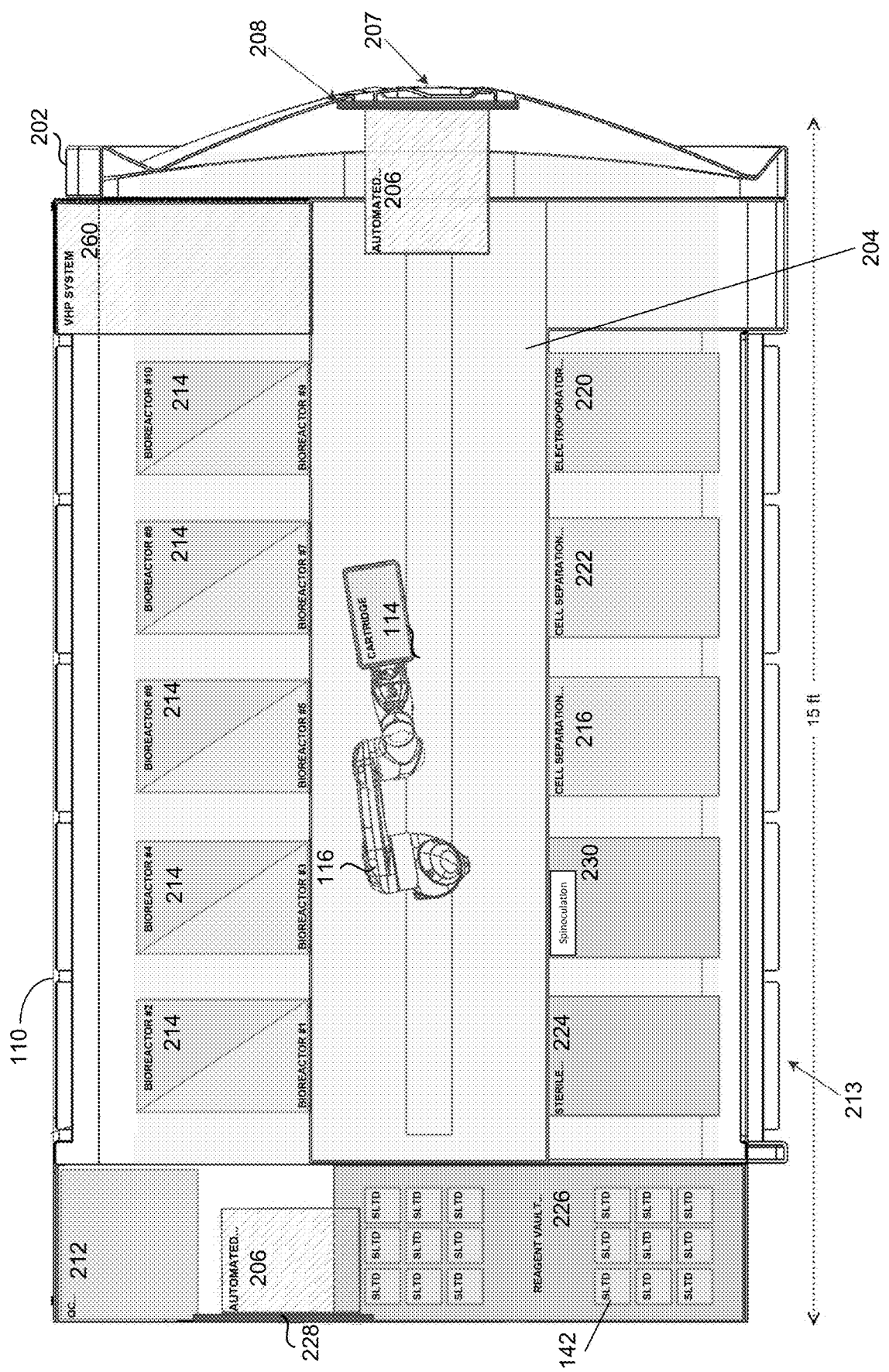
FIG. 2A is a rendering of an illustrative variation of a cell processing system.
Figure 2B:
FIG. 2B is a rendering of an illustrative variation of a cell processing system.

FIG. 2A and FIG. 2B show an illustrative cell processing system for use with the devices, systems, and methods described herein. Shown there is workcell 110. The workcell may be divided into an interior zone 204 with a feedthrough 206 and quality control (QC) instrumentation 212. An air filtration inlet (not shown) may provide high-efficiency particulate air (HEPA) filtration to provide ISO7 or better air quality in the interior zone 204. This air filtration may maintain sterile cell processing in an ISO8 or ISO9 manufacturing environment. The workcell 110 may also have an air filter on the air outlet to preserve the ISO rating of the room. Similar to the workcell described above in reference to FIG. 1, the workcell 110 may further comprise, inside the interior zone 204, a bioreactor instrument 214, a cell separation instrument 216 (e.g., magnetic separation instrument), an electroporation instrument 220, a counterflow centrifugation elutriation (CCE) instrument 222, a sterile liquid transfer instrument 224 (e.g., fluid connector), a reagent vault 226, a spinoculation instrument 230, and a sterilization system 260. In other embodiments, different instruments can be combined at one slot or bay, such that two or more instruments can interact with a cartridge positioned in the bay. The reagent vault 226 may be accessible by a user through a sample pickup port 228. A robot 116 (e.g., support arm, robotic arm) may be configured to move one or more cartridges 114 (e.g., consumables) from any instrument to any other instrument and/or move one or more cartridges 114 to and from a reagent vault. In some embodiments, the workcell 110 may comprise one or more moveable barriers 213 (e.g., access, door) configured to facilitate access to one or more of the instruments in the workcell 110. In some variations, an outer surface of an enclosure 202 may comprise an input/output device 208 (e.g., display, touchscreen).

In some embodiments, a human operator may load one or more cartridges 114 into the feedthrough 206 via cartridge port 207. The cartridges 114 may be pre-sterilized, or the feedthrough 206 may sterilize the cartridge 250 using ultraviolet radiation (UV), or chemical sterilizing agents provided as a spray or wash. The feedthrough 206 chamber may optionally be configured to automatically spray, wash, irradiate, or otherwise treat cartridges (e.g., with ethanol and/or isopropyl alcohol solutions) to maintain sterility of the interior zone 204 (e.g., ISO 7 or better). The cartridge 116 may be passed to the biosafety cabinet 206, where input cell product is provided and loaded to the cartridge using a sterile liquid transfer instrument 224 (e.g., fluid connector) into the cartridge 116. The user may then move the cartridge 250 back to the feedthrough 206 and initiate automated processing using a computer processor in the computer server rack 210 (e.g., controller 120). The robot 230 may be configured to move the cartridge 250 in a predefined sequence to a plurality of instruments and stations, with the components of the workcell 200 being controlled by the computer processor of the computer server rack 210.

Other suitable cell processing systems and aspects thereof are provided e.g., in U.S. patent application Ser. No. 17/198,134, published as U.S. Patent Publication No. 2021/0283565, which is incorporated by reference herein.

A. Workcell i. Robot

Generally, a robot of the workcell may comprise any mechanical device capable of moving a cartridge from one location to another location within the workcell. For example, the robot may comprise a mechanical manipulator (e.g., an arm) in a fixed location, or attached to a linear rail, or a 2- or 3-dimensional rail system. While shown in some of the figures as being fixed in place or with respect to a rail system, the robot need not be so. For example, in some variations, the robot comprises a wheeled device. Any number of robots may be used within the workcells described herein. For example, in some embodiments, the workcell comprises two or more robots of the same or different type (e.g., two robotic arms each independently configured for moving cartridges between instruments). The robot may also comprise an end effector for precise handling of different cartridges or barcode scanning or radio-frequency identification tag (RFID) reading. The robots for use with the cell processing systems described herein are capable of moving cartridges between slots or bays in the workcell so that the modules within the cartridge can couple to corresponding instruments within the workcell to perform different cell processing steps.

ii. Controller

In embodiments, a cell processing system 100 may comprise a controller 120 (e.g., computing device) comprising one or more of a processor 122, memory 124, communication device, 126, input device 128, and display 130. The controller 120 may be configured to control (e.g., operate) the workcell 110. The controller 120 may comprise a plurality of devices. For example, the workcell 110 may enclose one or more components of the controller 120 (e.g., processor 122, memory 124, communication device 126) while one or more components of the controller 120 may be provided remotely to the workcell 110 (e.g., input device 128, display 130).

iii. Processor

The processor (e.g., processor 122) described here may process data and/or other signals to control one or more components of the system. The processor may be configured to receive, process, compile, compute, store, access, read, write, and/or transmit data and/or other signals. Additionally, or alternatively, the processor may be configured to control one or more components of a device (e.g., console, touchscreen, personal computer, laptop, tablet, server).

In some embodiments, the processor may be configured to access or receive data and/or other signals from one or more of workcell 110, server, controller 120, and a storage medium (e.g., memory, flash drive, memory card, database). In some embodiments, the processor may be any suitable processing device configured to run and/or execute a set of instructions or code and may include one or more data processors, image processors, graphics processing units (GPU), physics processing units, digital signal processors (DSP), analog signal processors, mixed-signal processors, machine learning processors, deep learning processors, finite state machines (FSM), compression processors (e.g., data compression to reduce data rate and/or memory requirements), encryption processors (e.g., for secure wireless data transfer), and/or central processing units (CPU). The processor may be, for example, a general-purpose processor, Field Programmable Gate Array (FPGA), an Application Specific Integrated Circuit (ASIC), a processor board, and/or the like. The processor may be configured to run and/or execute application processes and/or other modules, processes and/or functions associated with the system. The underlying device technologies may be provided in a variety of component types (e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, and the like.

The systems, devices, and/or methods described herein may be performed by software (executed on hardware), hardware, or a combination thereof. Hardware modules may include, for example, a general-purpose processor (or microprocessor or microcontroller), a field programmable gate array (FPGA), and/or an application specific integrated circuit (ASIC). Software modules (executed on hardware) may be expressed in a variety of software languages (e.g., computer code), including structured text, typescript, C, C++, C#, Java®, Python, Ruby, Visual Basic®, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

iv. Memory

The cell processing systems and devices described here may include a memory (e.g., memory 124) configured to store data and/or information. In some embodiments, the memory may include one or more of a random-access memory (RAM), static RAM (SRAM), dynamic RAM (DRAM), a memory buffer, an erasable programmable read-only memory (EPROM), an electrically erasable read-only memory (EEPROM), a read-only memory (ROM), flash memory, volatile memory, non-volatile memory, combinations thereof, and the like. In some embodiments, the memory may store instructions to cause the processor to execute modules, processes, and/or functions associated with the device, such as image processing, image display, sensor data, data and/or signal transmission, data and/or signal reception, and/or communication. Some embodiments described herein may relate to a computer storage product with a non-transitory computer-readable medium (also may be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The computer code (also may be referred to as code or algorithm) may be those designed and constructed for the specific purpose or purposes. In some embodiments, the memory may be configured to store any received data and/or data generated by the controller and/or workcell. In some embodiments, the memory may be configured to store data temporarily or permanently.

v. Input Device

In some embodiments, an input device 128, for example, may comprise or be coupled to a display. The input device may be any suitable device that is capable of receiving input from a user, for example, a keyboard, buttons, touch screen, etc. The input device may include at least one switch configured to generate a user input. For example, an input device may include a touch surface for a user to provide input (e.g., finger contact to the touch surface) corresponding to a user input. An input device including a touch surface may be configured to detect contact and movement on the touch surface using any of a plurality of touch sensitivity technologies including capacitive, resistive, infrared, optical imaging, dispersive signal, acoustic pulse recognition, and surface acoustic wave technologies. In embodiments of an input device including at least one switch, a switch may have, for example, at least one of a button (e.g., hard key, soft key), touch surface, keyboard, analog stick (e.g., joystick), directional pad, mouse, trackball, jog dial, step switch, rocker switch, pointer device (e.g., stylus), motion sensor, image sensor, and microphone. A motion sensor may receive user movement data from an optical sensor and classify a user gesture as a user input. A microphone may receive audio data and recognize a user voice as a user input.

In some embodiments, the cell processing system may optionally include one or more output devices in addition to the display, such as, for example, an audio device and haptic device. An audio device may audibly output any system data, alarms, and/or notifications. For example, the audio device may output an audible alarm when a malfunction is detected. In some embodiments, an audio device may include at least one of a speaker, a piezoelectric audio device, a magnetostrictive speaker, and/or a digital speaker. In some embodiments, a user may communicate with other users using the audio device and a communication channel. For example, a user may form an audio communication channel (e.g., VoIP call).

Additionally, or alternatively, the system may include a haptic device configured to provide additional sensory output (e.g., force feedback) to the user. For example, a haptic device may generate a tactile response (e.g., vibration) to confirm user input to an input device (e.g., touch surface). As another example, haptic feedback may notify that user input is overridden by the processor.

vi. Communication Device

In some embodiments, the controller may include a communication device (e.g., communication device 126) configured to communicate with another controller and one or more databases. The communication device may be configured to connect the controller to another system (e.g., Internet, remote server, database, workcell) by wired or wireless connection. In some embodiments, the system may be in communication with other devices via one or more wired and/or wireless networks. In some embodiments, the communication device may include a radiofrequency receiver, transmitter, and/or optical (e.g., infrared) receiver and transmitter configured to communicate with one or more devices and/or networks. The communication device may communicate by wires and/or wirelessly.

vii. Display

Image data may be output on a display e.g., display 130) of a cell processing system. In some embodiments, a display may include at least one of a light emitting diode (LED), liquid crystal display (LCD), electroluminescent display (ELD), plasma display panel (PDP), thin film transistor (TFT), organic light emitting diodes (OLED), electronic paper/e-ink display, laser display, and/or holographic display.

viii. Graphical User Interface

In some embodiments, as indicated above, a GUI may be configured for designing a process and monitoring a product. For example, the GUI may be a process design home page. The GUI may indicate that no processes have been selected or loaded. A create icon (e.g., "Create a Process") may be selectable for a user to begin a process design process. In some embodiments, one or more of the GUIs described herein may include a search bar.

B. Cartridge

Figure 3:
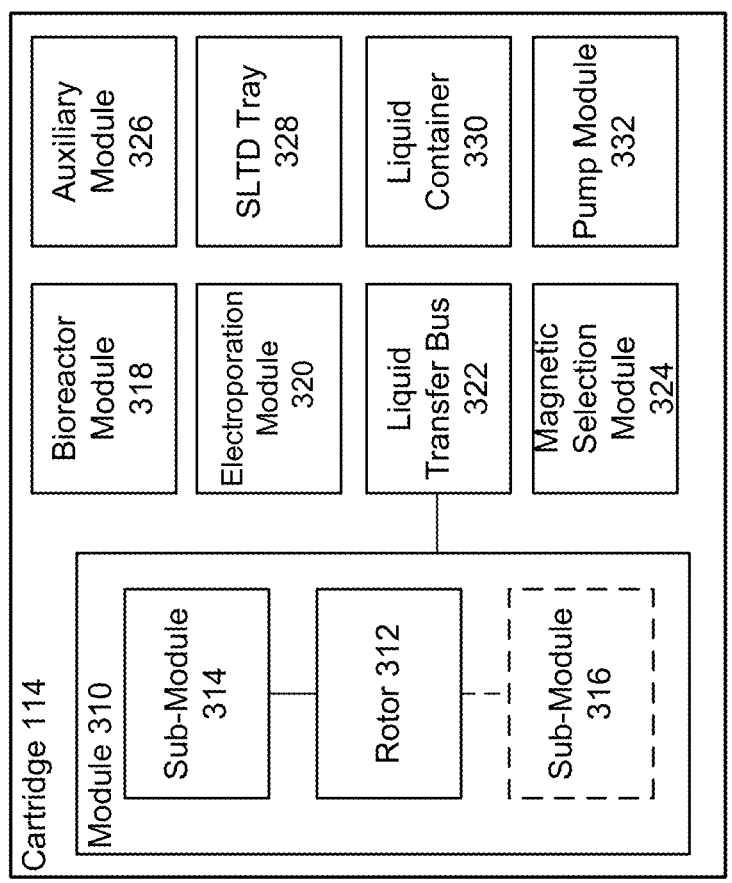
FIG. 3 is a block diagram of an illustrative variation of a cartridge.

The cell processing systems described herein may comprise one or more cartridges having one or more modules configured to interface with one or more instruments within the workcell. FIG. 3 shows an illustrative variation of a cartridge 114. The cartridge 114 may comprise a module 310, a bioreactor module 318, an electroporation module 320, a liquid transfer bus 322, a magnetic selection module 324, an auxiliary module 326, an SLTD tray 328, a liquid container 330, and a pump module 332.

The module 310 may comprise a sub-module 314 and a rotor 312. The sub-module 314 may be coupled to the rotor 312. In some embodiments, the module 310 may further comprise a sub-module 316. The sub-module 316 may be coupled to the rotor 312. The sub-modules 314 and 316 may share the same rotor 312. The module 310 may be fluidically connected to the liquid transfer bus 322. In some variations, the sub-modules 314 and 316 may be fluidically connected to the liquid transfer bus 322 via the module 310.

The bioreactor module 318 may comprise a vessel configured to culture mammalian cells. Generally, cell and gene therapy products may be grown in a bioreactor to produce a clinical dose which may subsequently be administered to a patient. A number of biological and environmental factors may be controlled to optimize the proliferation speed and success of cell growth.

The electroporation module 320 may be configured to facilitate intracellular delivery of macromolecules (i.e., transfection by electroporation). The electroporation module 320 may contain a continuous flow or batch mode chamber and one or more sets of electrodes for applying direct or alternating current to the chamber. An electrical discharge from one or more capacitors, or current sources, may generate sufficient current in the chamber to promote transfer of a polynucleotide, protein, nucleoprotein complex, or other macromolecule into the cells in the cell product. As with other modules described herein, one or more components used for the process step (here, electroporation) may be provided on the cartridge or in the instrument to which the cartridge interfaces. For example, the capacitor(s) and/or batteries may be provided in the module on the cartridge or in the instrument.

The liquid transfer bus 322 may comprise at least one fluid conduit. The at least one fluid conduit of the liquid transfer bus 322 may be configured to contain at least one fluid. For example, the at least one fluid may be a liquid. In some variations, the at least one fluid may be a gas. In some variations, the at least one fluid may comprise a solution of cells of varying sizes and densities. The liquid transfer bus 322 may comprise at least one fluid inlet and at least one fluid outlet. The liquid transfer bus 322 may comprise at least one valve. The liquid transfer bus 322 may be fluidically connected to at least one module within the cartridge 114. For example, the liquid transfer bus 322 may be configured to transfer at least one fluid to at least one module within the cartridge 114. The liquid transfer bus 322 may be fluidically connected to at least one instrument within the workcell 110. The liquid transfer bus 322 may be in communication with the controller 120. For example, at least one valve of the liquid transfer bus 322 may open and/or close in response to a command sent by the controller 120.

The magnetic selection module 324 may perform a magnetic-activated cell selection process. For example, a cell suspension of interest may be immunologically labeled with magnetic particles (e.g., magnetic beads) configured to selectively bind to the surface of the cells of interest. The labeled cells may generate a large magnetic moment when the cell suspension is flowed through a flow cell. The flow cell may be disposed in proximity to a magnet array (e.g., permanent magnets, electromagnet) generating a magnetic field having a gradient across the flow cell to attract the labeled cells for separation, capture, recovery, and/or purification. The magnet array may be configured to generate non-uniform magnetic fields at the edges and the interfaces of the individual magnets so as to cover the full volume of the flow cell such that a magnetophoretic force equals a drag force exerted by the fluid flowing through the flow cell.

The SLTD tray 328 may comprise one or more SLTD slots configured to receive one or more SLTD 142. In some variations, the SLTD tray 328 may comprise 1 SLTD slot, 2 SLTD slots, 3 SLTD slots, 4 SLTD slots, 5 SLTD slots, 6 SLTD slots, 7 SLTD slots, 8 SLTD slots, 9 SLTD slots, 10 SLTD slots, 11 SLTD slots, 12 SLTD slots, 13 SLTD slots, 14 SLTD slots, or 15 SLTD slots. Each SLTD slot of the SLTD tray 328 may comprise a fluidic conduit configured to fluidically connect with at least one module of the cartridge 114. For example, each slot of the SLTD tray 328 may be fluidically connected to the liquid transfer bus 322. In this way, a fluid may flow from the liquid transfer bus 322 to an SLTD 142 contained within one slot of the SLTD tray 328.

The liquid container 330 may be configured to contain a fluid. In some variations, the fluid is a liquid. In some variations, the fluid is a gas. The gas may be pressurized. The liquid container 330 may be fluidically connected to at least one module of the cartridge 114. In some variations, the liquid container 330 comprises a plurality of liquid containers. For example, the liquid container 330 may comprise one container, two containers, or three containers. In some variations, the liquid container 330 may be fluidically connected to the liquid transfer bus 322. In this way, a fluid may flow from the liquid transfer bus 322 to the liquid container 330.

The pump module 332 may comprise a pump configured to pump fluid in one or more directions along at least one fluid path. For example, the pump module 332 may be configured to pump a fluid to or from one or more of the module 310, the bioreactor module 318, the electroporation module 320, the liquid transfer bus 322, the magnetic selection module 324, the auxiliary module 326, the SLTD tray 328, and the liquid container 330.

The auxiliary module 326 may be configured to engage with at least one instrument and/or module. The auxiliary module 326 may comprise at least one electrical connector and/or at least one fluidic connector. In some variations, the auxiliary module 326 may be removed and replaced by any other module.

Figure 4:
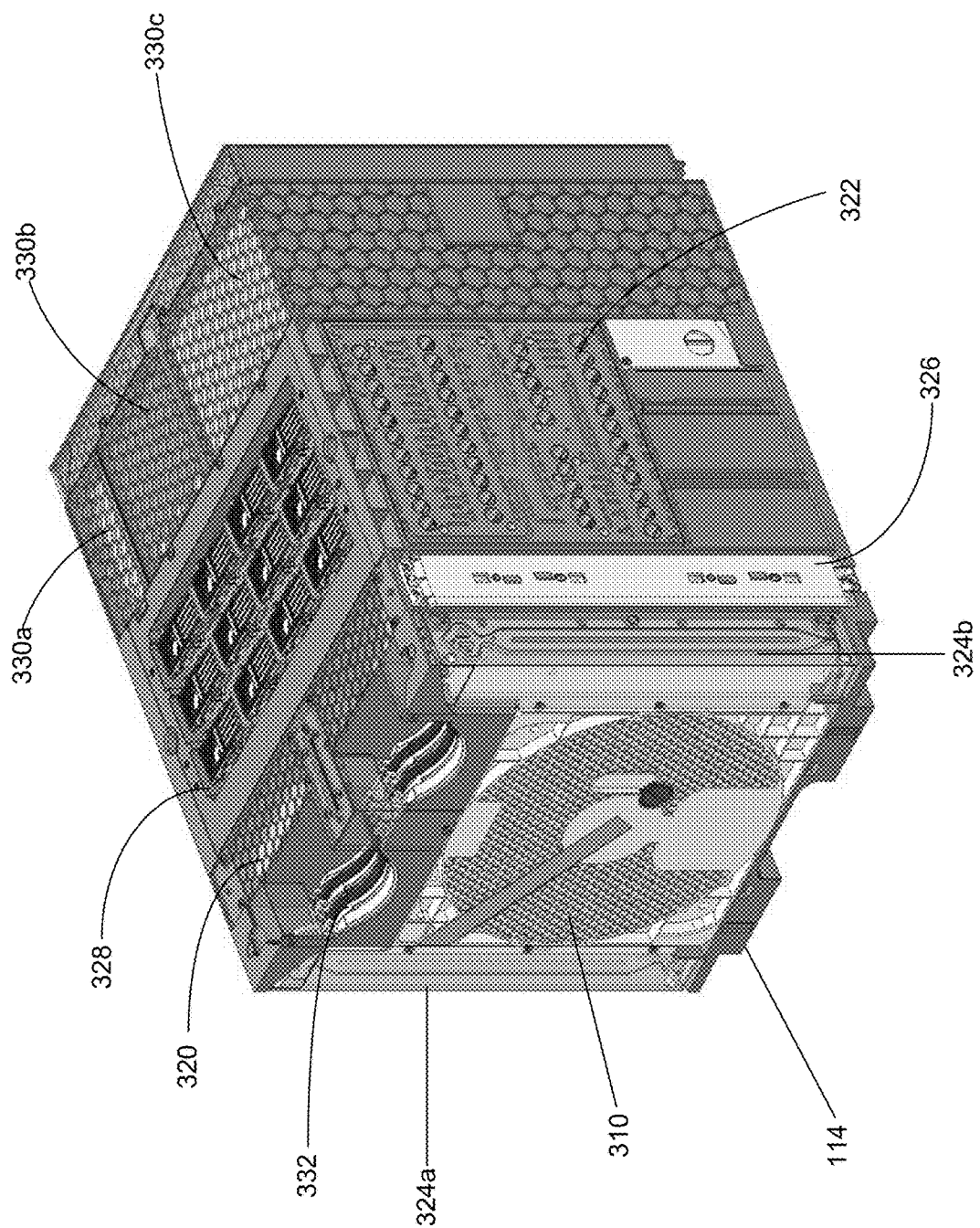
FIG. 4 is a rendering of an illustrative variation of a cartridge.

FIG. 4 shows an illustrative rendering of a cartridge 114. The cartridge 114 may comprise a module 310, an electroporation module 320, a liquid transfer bus 322, a first magnetic selection module 324a and a second magnetic selection module 324b, an auxiliary module 326, a SLTD tray 328, a first liquid container 330a, a second liquid container 330b, a third liquid container 330c, and a pump module 332. In some variations, the cartridge 114 may comprise at least one handle configured for use by a human. In further variations, the cartridge 114 may comprise at least one engagement feature configured for use by a robot. For example, the cartridge 114 may engage with a robot 116 of a workcell 110.

Various materials may be used to construct the cartridge and the cartridge housing, including metal, plastic, rubber, and/or glass, or combinations thereof. The cartridge, its components, and its housing may be molded, machined, extruded, 3D printed, or any combination thereof. The cartridge may contain components that are commercially available (e.g., tubing, valves, fittings). The commercially available components may be attached or integrated with custom components or devices. The housing of the cartridge may constitute an additional layer of enclosure that further protects the sterility of the cell product.

In some embodiments, the modules may be integrated in a fixed configuration within the cartridge or a housing within the cartridge. Additionally, or alternatively, the modules may be configurable or moveable within the cartridge, permitting various formats of cartridges to be assembled. For example, the cartridge can be a single, closed unit with fixed components for each module, or the cartridge may contain configurable modules coupled by configurable fluidic, mechanical, optical, and electrical connections. In some variations, one or more sub-cartridges, each containing a set of modules, or one or more sub-modules within a single cartridge, may be used to perform various cell processing workflows. The modules may each be provided in a distinct housing or may be integrated into a single housing, cartridge, or sub-cartridge with other modules. In some embodiments, multiple cartridges may be used to process a single cell product through transfer of the cell product from one cartridge to another cartridge of the same or different type and/or by splitting cell product into more cartridges and/or pooling multiple cell products into fewer cartridges.

Generally, each of the instruments within the workcell interfaces with its respective module or modules on the cartridge. For example, when a cartridge has an electroporation module, it may be moved by the robot to the electroporation instrument within the workcell to perform electroporation on the cells within the cartridge. One advantage of such split module/instrument designs is that expensive components (e.g., motors, sensors, heaters, lasers, etc.) may be retained in the instruments of the system while less expensive components reside in the cartridge, which is typically disposable and configured for single-use. The use of disposable cartridges may eliminate the need to sterilize cartridges between use. Furthermore, having multiple instruments within the workcell further helps allow for the parallel utilization of those instruments when multiple cartridges are used within the workcell. In contrast, most conventional semi-automated instruments have instrument components that sit idle and are incapable of simultaneous parallel use.

C. Combined Spinoculation and CCE Module

As described above, the cell processing steps that may be performed include spinoculation and counterflow centrifugal elutriation. In some embodiments, where spinoculation is performed, the cartridge comprises a spinoculation sub-module and the workcell comprises a corresponding spinoculation instrument. In some embodiments, where counterflow centrifugal elutriation is performed, the cartridge comprises an elutriation sub-module and the workcell comprises a corresponding elutriation instrument. In some embodiments, the cartridge comprises both of a spinoculation sub-module and an elutriation sub-module, and the workcell comprises an instrument corresponding to both spinoculation and elutriation. In some embodiments, spinoculation and counterflow centrifugal elutriation may be performed in series.

Figure 5:
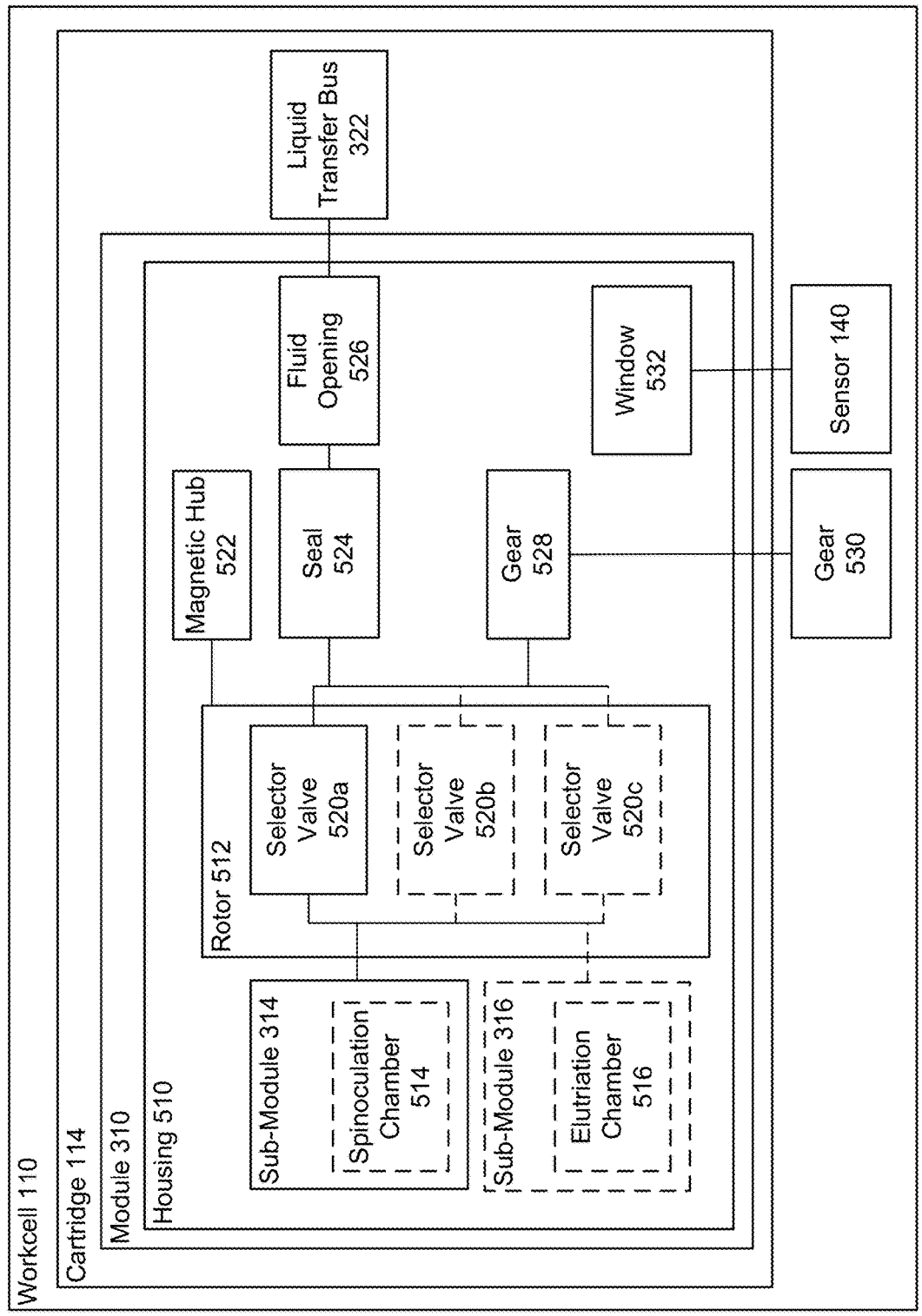
FIG. 5 is a block diagram of an illustrative module of a cartridge.

FIG. 5 provides a schematic illustration of a workcell 110 comprising an exemplary cartridge 114. The cartridge 114 may comprise a module 310. The module 310 may be coupled to one or more other modules of the cartridge 114. In some variations, the module 310 may be fluidically connected to a liquid transfer bus 322 via at least one fluid conduit. For example, liquid transfer bus 322 may comprise at least one valve configured to begin and/or stop fluid flow through the at least one fluid conduit coupled to the module 310. In some variations, the liquid transfer bus 322 may comprise a first fluid conduit configured to direct fluid to the module 310 and a second fluid conduit configured to receive fluid from the module 310. In some variations, there may be a plurality of fluid conduits directing fluid to the module 310 and a plurality of fluid conduits receiving fluid from the module 310. In some variations, the module 310 may be fluidically connected to any other module of the cartridge 114 such as the pump module 332, the liquid container 330, and/or the bioreactor module 318. For example, the module 310 may receive fluid from the liquid transfer bus 322 and output fluid to the liquid container 330, or vice versa. In some embodiments, the module 310 may receive fluid from and/or transmit fluid to any instrument within the workcell 110. For example, the module 310 may receive fluid from and/or transmit fluid to an elutriation instrument and/or a spinoculation instrument.

The module 310 may be mechanically coupled to one or more modules of the cartridge 114. For example, the module 310 may be fastened to a magnetic selection module 324, pump module 322, auxiliary module 326, or any other module of the cartridge 114 via at least one screw, glue, adhesive, tape, clamp, or any other suitable means. In some variations, the module 310 may be mechanically coupled to a sidewall of the cartridge 114. In further variations, the module 310 may be positioned within the cartridge 114 via a friction force and/or a compressive force. The module 310 may comprise metal, plastic, rubber, glass, or combinations thereof. The material used to construct the module 310 may be selected based on compatibility with one or more modules within the cartridge 114, one or more instruments within the workcell 110, and/or one or more fluids used in the workcell 110.

The module 310 may comprise a container or housing configured to securely contain at least one component. In some embodiments, the module 310 may comprise a housing 510. The housing 510 may comprise a sub-module 314. In some variations, the housing 510 may comprise a sub-module 316, which may be different than the sub-module 314. In further variations, the sub-modules 314 and 316 may be substantially identical. In some variations, the sub-module 314 may comprise a spinoculation sub-module. The sub-module 314 may further comprise a spinoculation chamber 514. The sub-module 314 may be configured to perform a spinoculation process. In some variations, the sub-module 316 may comprise an elutriation sub-module. The sub-module 316 may further comprise an elutriation chamber 516 comprising an elutriation cone. The sub-module 316 may be configured to perform an elutriation process.

The housing 510 may further comprise at least one component configured to rotate. In some embodiments, the housing 510 may comprise a rotor 512. The rotor 512 may be coupled to the sub-module 314. In some variations, the rotor 512 may also be coupled to the sub-module 316. In this way, the sub-modules 314 and 316 may advantageously share the same rotor 512 to alleviate the workflow challenges and housing complexities described above. The rotor 512 may be configured to rotate at a high rate. For example, the rotor may rotate at about 500 rpm, about 1000 rpm, about 2000 rpm, about 3000 rpm, about 4000 rpm, about 5000 rpm, or about 6000 rpm. In some variations, the rate of rotation may be determined by the cell processing step to be performed. In further variations, the rate of rotation may be determined by the volume of fluid contained within the sub-module 314 and/or sub-module 316. The rotor 512 may be configured to rotate within the housing 510 without damaging any other component within the housing 510, module 310, cartridge 114, and/or workcell 110. The rate of rotation of the rotor 512 may be determined by a vibration level associated with the housing 510 and/or module 310 while the rotor 512 rotates.

The rotor 512 may be configured to direct fluid therethrough. In some embodiments, the rotor 512 may comprise a selector valve 520. The selector valve 520 may comprise a rotary valve. The selector valve 520 may comprise at least one fluidic path therethrough. The selector valve 520 may be configured to rotate between one or more positions. In some variations, the rotation of the selector valve 520 may adjust the fluidic path therethrough. The selector valve 520 may comprise a first selector valve 520a. In some variations, the selector valve 520 may further comprise a second selector valve 520b and a third selector valve 520c. In some variations, one or more of the selector valves 520a, 520b, 520c may advantageously be fluidically connected to one or more of the sub-modules 314, 316. For example, the selector valves 520a, 520b, 520c may define a first fluid flow path configured to direct fluid to the sub-module 314. The first fluid flow path may comprise a fluidic connection between the liquid transfer bus 322 and the spinoculation chamber 514. In another example, the selector valves 520a, 520b, 520c may define a second fluid flow path configured to direct fluid to the sub-module 316. The second flow path may comprise a fluidic connection between the liquid transfer bus 322 and the elutriation chamber 516. In yet another example, the selector valves 520a, 520b, 520c may define a third fluid flow path to direct fluid to each of the sub-modules 314 and 316 in series. The third flow path may comprise a fluidic connection between the liquid transfer bus 322 and each of the spinoculation chamber 514 and elutriation chamber 516. The selector valves 520a, 520b, 520c can thus advantageously enable controlled operation of either one or both of the spinoculation chamber 514 or elutriation chamber 516.

The housing 510 may further comprise at least one mechanical means for adjusting a configuration of the selector valve 520. In some embodiments, the housing 510 may comprise a gear 528. The gear 528 may define an axis of rotation. The gear 528 may comprise a plurality of gear teeth. The gear 528 may comprise a thickness determined by an overall thickness of the housing 510. For example, the gear 528 may be configured to sit flush with an external surface of the housing 510. The gear 528 may be configured to engage with at least one selector valve 520. For example, teeth of the gear 528 may correspond to and engage with the first selector valve 520a. The gear 528 may be configured to adjust a position of the selector valve 520. For example, rotation of the gear 528 may adjust a position of one or more of the selector valves 520a, 520b, 520c. In some variations, adjusting the selector valve 520 may comprise rotating the selector valve 520.

The selector valve 520 may comprise a first position and a second position. The selector valve 520 may be adjusted between the first and second positions via rotation in a clockwise and/or a counterclockwise direction. The selector valve 520 may further comprise a detent. The detent may comprise a protrusion and/or depression configured to apply a force to the selector valve 520. The force applied by the detent may prevent rotation of the selector valve 520 under passive conditions. For example, the force applied to the detent may be greater than the force of gravity acting on the selector valve 520. The force applied by the detent may be overcome by rotation of the gear 528 that, in turn, adjusts the position of the selector valve 520. The detent may comprise a first detent and a second detent. The first and second detents may be located adjacent to the outer circumference of the selector valve 520 such that the detent is engageable when the selector valve 520 rotates. In this way, the detent may be located within the path of rotation of the selector valve 520. In some variations, the first detent is in a first location along the path of rotation and the second detent is in a second location along the path of rotation. In some variations, the first location of the first detent is separated by approximately 180 degrees from the second position of the second detent. The first detent may be associated with the first position of the selector valve 520 and the second detent may be associated with the second position of the selector valve 520.

The rotor 512 may further comprise a hard stop associated with the selector valve 520. The hard stop may comprise a protrusion configured to apply a force to the selector valve 520. The force applied by the hard stop may be configured to prevent rotation of the selector valve 520. The force applied by the hard stop may not be overcome by rotation of the gear 528. In some variations, each of the selector valves 520a, 520b, 520c have separate hard stops.

The workcell 110 may be configured to engage with the gear 528 of the housing 510. In some embodiments, the workcell 110 may further comprise a gear 530. The gear 530 may be associated with an instrument of the workcell 110. For example, the gear 530 may be associated with one or more an elutriation instrument and a spinoculation instrument. The gear 530 may be in communication with the controller 120. For example, a user may input a command into the controller 120 to rotate the gear 530. The gear 530 may be configured to engage with the gear 528. For example, the gear 530 may rotate in response to a command transmitted by the controller 120, which in turn rotates the gear 528. In this way, a user may adjust the selector valve 520 via the gears 528, 530.

The housing 510 may be configured to rotate one or more components contained therein. In some embodiments, the housing 510 further comprises a magnetic hub 522. The magnetic hub 522 may be coupled to the rotor 512. The magnetic hub 522 may be configured to rotate the rotor 512 about a rotation axis defined by the magnetic hub 522. The magnetic hub 522 may comprise one or more magnets. For example, the magnetic hub 522 may comprise one or more electromagnets. The magnetic hub 522 may be electrically connected to the cartridge 114. For example, the magnetic hub 522 may rotate in response to an electrical signal sent by the cartridge 114 to one or more magnets within the magnetic hub 522. In some variations, the rate of rotation of the rotor 512 may be determined by the amplitude of the electrical signal sent to the magnetic hub 522. In some variations, the magnetic hub 522 may be magnetically coupled to the cartridge 114. For example, the cartridge 114 may comprise at least one magnet that corresponds to the magnetic hub 522. The magnetic hub 522 may be configured to rotate in response to a command from the controller 120.

The housing 510 may further comprise at least one component configured to fluidically communicate with one or more modules of the cartridge 114 and/or the workcell 110. In some embodiments, the housing 510 comprises a seal 524 and a fluid opening 526. The fluid opening 526 may be configured to receive at least one fluid. The fluid opening 526 may be fluidically connected to the liquid transfer bus 322. In some variations, the fluid opening 526 may be fluidically connected to one or more of the bioreactor module 318, auxiliary module 326, liquid container 330, magnetic selection module 324, and pump module 332. The fluid opening 526 may be fluidically connected to the rotor 512. For example, the liquid transfer bus 322 may direct fluid through the fluid opening 524 and to one or more fluid paths of the rotor 512. In a further example, the rotor 512 may direct fluid through the fluid opening 524 and to the liquid transfer bus 322. In some variations, the fluid opening 524 comprises a stainless steel tube permanently molded into the rotor 512. The seal 524 may be configured to fluidically seal a fluid path through the fluid opening 526.

The seal 524 may be referred to as a dynamic seal. The seal 524 may be configured to be in direct contact with at least one fluid. The seal 524 may maintain its efficacy as a fluid seal when the seal 524 is substantially wet. In some variations, the seal 524 may require continuous fluid flow therethrough to maintain its efficacy as a fluid seal. In further variations, the seal 524 may not require continuous fluid flow therethrough to maintain its efficacy as a fluid seal. In some variations, the seal 524 may comprise an O-ring. In some variations, the seal 524 may comprise one or more of nitrile, neoprene, ethylene propylene, silichamber, fluorocarbon, and polytetrafluoroethylene (PTFE).

The housing 510 may further comprise at least one feature configured to provide means to measure a parameter associated with the conditions within the housing 510. In some embodiments, the housing 510 may comprise a window 532. The window 532 may comprise a substantially transparent material in a wall of the housing 510. In some variations, the window 532 may comprise one or more of polyethylene terephthalate, polypropylene, polycarbonate, glass, and other transparent material. The window 532 may comprise a circle, a rectangle, a triangle, a trapezoid, or any other geometric shape. The window 532 may be operatively coupled with a sensor 140 of the workcell 110. For example, a sensor 140 comprising an optical sensor may be configured to measure at least one parameter of the housing 510 through the window 532. In some variations, the sensor 140 may be configured to measure a rate of rotation of the housing 510. In further variations, the sensor 140 may be configured to measure a parameter associated with the elutriation chamber 516. For example, the sensor 140 may be configured to measure one or more of a quantity and a position of cells within the elutriation chamber 516. In some variations, at least a portion of a wall of the elutriation chamber 516 comprises a transparent material. In yet further variations, the sensor 140 may be configured to measure a parameter associated with the spinoculation chamber 514. For example, the sensor 140 may be configured to measure one or more of a quantity and a position of cells within the spinoculation chamber 514. In some variations, the sensor 140 comprises a first sensor 140a and a second sensor 140b.

FIG. 6A and FIG. 6B show renderings of an exemplary embodiment of a module 310. The module 310 may comprise a first housing 510a and a second housing 510b. The first housing 510a and second housing 510b may be coupled together. In some variations, the housings 510a, 510b may be coupled together via at least one screw, an adhesive, a weld, or any means suitable to maintain a rigid connection. In further variations, the housings 510a, 510b may be removably coupled. For example, the housings 510a, 510b may be separated to allow a user to conduct maintenance of any component contained therein. In some variations, the housings 510a, 510b may comprise a honeycomb structure. The honeycomb structure may be desired to reduce the mass of the housings 510a, 510b while maintaining sufficient rigidity such that the housing 510a, 510b may withstand the forces associated with rotating at high rates.

The housing 510a may further comprise a gear 528 and a groove 616. The gear 528 may be adjacent to the groove 616. The groove 616 may be configured to receive the gear 530 of the workcell 110. The groove 616 may comprise a depth associated with a thickness of the gear 530. For example, the depth of the groove 616 may enable the gear teeth of the gear 530 to fully engage with the gear teeth of the gear 528. In some variations, the depth of the groove 616 may prevent the gear 530 from contacting the external surface of the housing 510a while the gear 530 rotates. In some variations, a length of groove 616 may be sufficient to allow the gear 530 to fully disengage from the gear 528. For example, the gear 530 may be engaged with the gear 528 when in a first position within the groove 616 and disengaged from the gear 528 when in a second position within the groove 616. In some embodiments, the gear 530 may be in the second position when the rotor 512 rotates. In this way, the gear 530 may not rotate with the rotor 512. In some variations, a width of the groove 616 may be determined by the diameter of the gear 530. In some embodiments, the diameter of the gear 530 is less than the diameter of the gear 528. In some variations, the diameter of the gear 530 is greater than the diameter of the gear 528.

The housing 510a may be configured to engage with a plurality of sensors. In some embodiments, the housing 510 further comprises a first window 532a and a second window 532b. Each of the windows 532a, 532b may comprise a substantially transparent material in a wall of the housing 510a. Each of the windows 532a, 532b may be operatively coupled with at least one sensor. For example, the window 532a may be operatively coupled to a sensor 140a. In another example, the window 532b may be operatively coupled to a sensor 140b.

The housing 510a may comprise at least one removable component. In some embodiments, the housing 510a further comprises a cover 610. The cover 610 may be configured to enclose at least one fluid path defined by the housing 510a. The cover 610 may be removable without otherwise removing the module 310 from the cartridge 114. The cover 610 may comprise a fluid outlet. The fluid outlet may comprise a through hole. In some variations, the fluid outlet may be fluidically connected to one or more instruments within the workcell 110. In further variations, the fluid outlet is fluidically connected to the liquid transfer bus 322. In yet further variations, the fluid outlet is fluidically sealed to prevent fluid flow therethrough.

The housing 510b may comprise a fluid opening 526 and a connector 612. The fluid opening 526 may be fluidically connected to at least one module of the cartridge 114. For example, the fluid opening 526 may be fluidically connected to the liquid transfer bus 322. The connector 612 may comprise a mechanical fastener configured to engage with at least one module of the cartridge 114. For example, the connector 612 may comprise a protrusion. In some variations, there may be a corresponding hole in a wall of the cartridge 114. For example, the connector 612 may be configured to secure the module 310 in a position within the cartridge 114. In further variations, there may be a corresponding hole in any other module within the cartridge 114. In this way, the housing 510b may be mechanically fastened to one or more modules.

FIG. 7A and FIG. 7B provides an exploded view of an exemplary embodiment of the module 310. The first housing 510a may be coupled to the second housing 510b. The housings 510a, 510 may comprise a substantially rectangular outer perimeter. Between the first and second housings 510a, 510b may be a magnetic hub 522. The magnetic hub 522 may be coupled to one or both of the housings 510a, 510b. In some variations, the magnetic hub 522 may be configured to rotate freely relative to the housings 510a, 510b. The module 310 may further comprise a rotor 512. The rotor 512 may be coupled to one or both of the housings 510a, 510b. In some variations, the rotor 512 may be configured to rotate freely relative to the housings 510a, 510b. The rotor 512 may comprise an opening configured to receive the magnetic hub 522. The magnetic hub 522 may protrude through the rotor 522.

The module 310 may further comprise components associated with a spinoculation process. In some embodiments, the module 310 comprises a spinoculation chamber 514. The spinoculation chamber 514 may comprise an outer chamber wall 514a and an inner chamber wall 514b. The chamber walls 514a, 514b may each comprise a circular shape. In some variations, there may be a gap between the chamber walls 514a, 514b. The size of the gap may determine a volume of fluid contained therein. For example, the gap may comprise about 0.5 mm, 1 mm, 2 mm, 3 mm, 4 mm, 5 mm, 6 mm, 7 mm, 8 mm, 9 mm, or 10 mm. The module 310 may further comprise a seal 710. The seal 710 may form a fluid-tight seal between the outer chamber wall 514a and inner chamber wall 514b. The seal 710 may also form a fluid-tight seal between the spinoculation chamber 514 and the second housing 510b. In some variations, the seal 710 may comprise a rubber O-ring.

Figure 8:
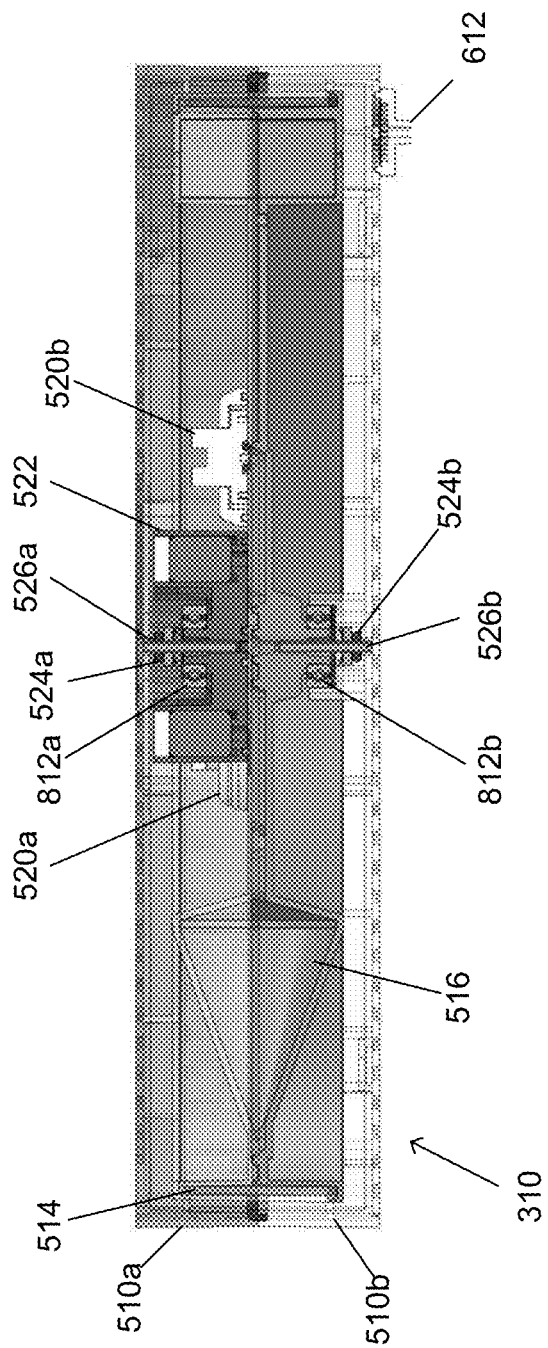
FIG. 8 is a rendering of a cross-sectional view of an illustrative module of a cartridge.

FIG. 8 shows a cross-sectional view of an exemplary embodiment of the cartridge 310. The cartridge 310 may comprise a first housing 510a, a second housing 510b, a first selector valve 520a, a second selector valve 520b, a third selector valve (not shown), a magnetic hub 522, and a connector 612. The cartridge 310 may further comprise an elutriation chamber 516. The elutriation chamber 516 may be defined by the rotor 512. In some variations, the elutriation chamber 516 may be defined by one or more of the housings 510a, 510b.

The module 310 may further comprise a first fluid opening 526a through the first housing 510a and a second fluid opening 526b through the second housing 510b. The first fluid opening 526a may comprise a tube with a lumen therethrough, the tube extending from the first housing 510a. The second fluid opening 526b may comprise a tube with a lumen therethrough, the tube extending from the first housing 510b. Surrounding each fluid openings 526a, 526b may be a seal 524. For example, a first seal 524a may surround the first fluid opening 526a. Similarly, a second seal 524b may surround the second fluid opening 526b. The first and second seals 524a, 524b may be configured to prevent fluid leakage from a fluid path through the fluid openings 526a, 526b into other volumes within the module 310.

The magnetic hub 522 may further comprise a bearing 812. The bearing 812 may comprise a first bearing 812a and a second bearing 812b. The first bearing 812a may be contained within first housing 510a. The second bearing 812b may be contained within the second housing 510b. The first and second bearings 812a, 812b may facilitate the rotation of one or more of the magnetic hub 522 and the rotor 512. The bearing 812 may be shared by the sub-modules 314, 316.

Figure 9:
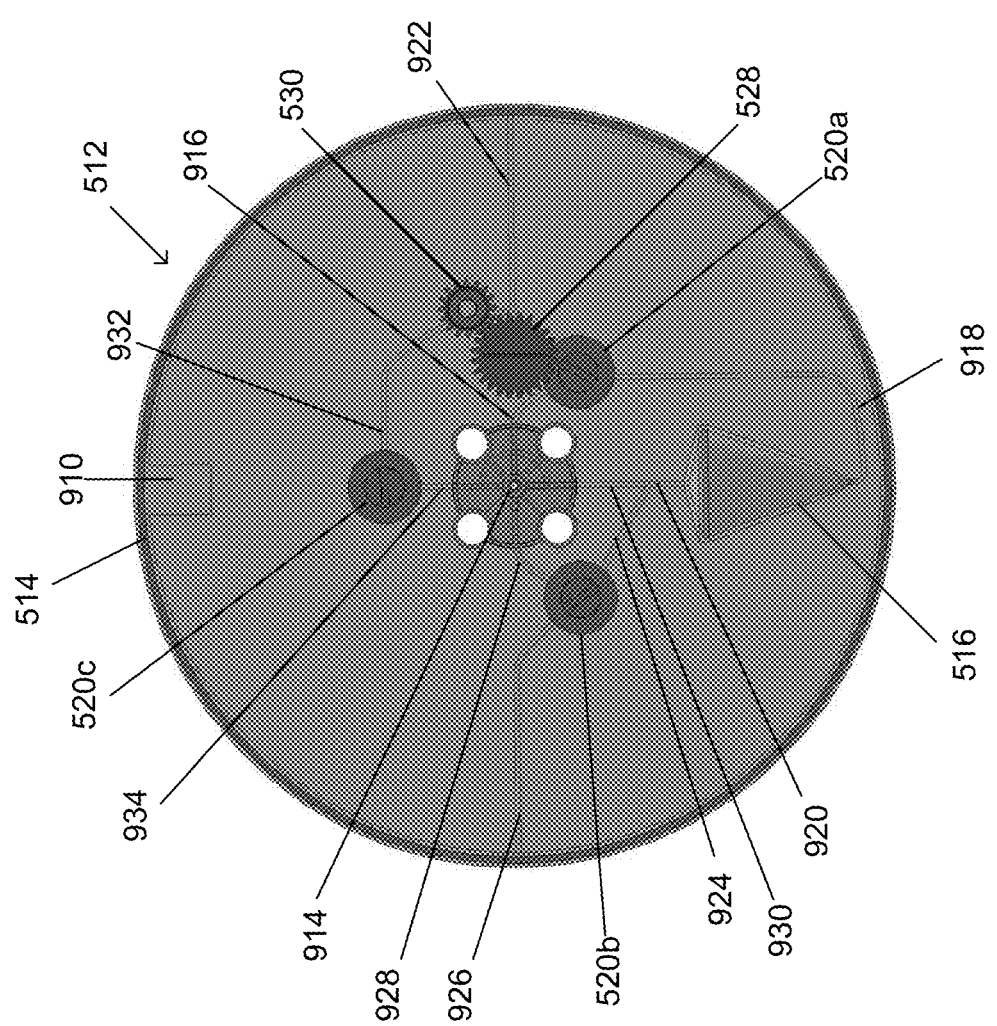
FIG. 9 is a rendering of an illustrative rotor of a module.

FIG. 9 shows an exemplary embodiment of a rotor 512. The rotor 512 may comprise a first selector valve 510a, a second selector valve 510b, and a third selector valve 510c. In some variations, the selector valves 510a, 510b, 510c are positioned approximately equidistant apart. The rotor 512 may further comprise a plurality of fluid paths. The plurality of fluid paths may be configured to direct fluid through at least one selector valve. A fluid may flow into the rotor through a fluid opening 914. The fluid opening 914 may be fluidically connected to each of the selector valves 520a, 520b, 520c through at least one fluid flow path. For example, the fluid opening 914 may be fluidically connected to the first selector valve 520a via flow path 916. The fluid opening 914 may be fluidically connected to the second selector valve 520b via flow path 928. The fluid opening 914 may be fluidically coupled to the third selector valve 520c via flow path 934. The fluid may flow through any of the flow paths 916, 928, 934 based on the configuration of each selector valve. For example, each selector valve may comprise a clockwise (CW) position and a counterclockwise (CCW) position. In some variations, the clockwise position may be a first position and the counterclockwise position may be a second position. Fluid may or may not flow through a selector valve based on its position. Each selector valve may be positioned independently of any other selector valve. In some variations, each selector valve may be positioned in conjunction with at least one other selector valve.

The rotor 512 may be coupled to the elutriation chamber 516. The elutriation chamber 516 may be fluidically connected to at least one selector valve 520. For example, the flow path 918 may fluidically connect the elutriation chamber 516 to the selector valve 520a. Similarly, the flow path 920 may fluidically connect the elutriation chamber 516 to the selector valve 520b. In yet another example, the flow path 930 may fluidically connect the elutriation chamber 516 to the selector valve 520c.

Additionally or separately, the rotor 512 may be coupled to a spinoculation chamber 514. The spinoculation chamber 514 may be fluidically connected to at least one selector valve 520. For example, the flow path 922 may fluidically connect the spinoculation chamber 514 to the selector valve 520a. Similarly, the flow path 926 may fluidically connect the spinoculation chamber 514 to the selector valve 520b. In yet another example, the flow path 932 may fluidically connect the spinoculation chamber 514 to the selector valve 520c.

The rotor 512 may be coupled to a gear 528. For example, the gear 528 may be operatively coupled to the first selector valve 520a. The gear 528 may comprise a plurality of teeth configured to engage with corresponding teeth on a gear 530. The gear 530 may be coupled to the cartridge 114. The gear 530 may be adjusted based on an input from the controller 130. The gear 530 may rotate in either a clockwise or counterclockwise direction. In some variations, the gear 530 may be engaged with the gear 528 such that rotational movement of the gear 530 may cause the gear 528 to rotate. The gear 528 may rotate in either a clockwise or counterclockwise direction. Subsequently, the rotation of gear 528 may rotate the first selector valve 520a. In some embodiments, the rotation of gear 528 may also rotate or adjust the second selector valve 520b and/or the third selector valve 520c. In some variations, the gear 528 may also be manually rotated by, for example, a user. The selector valves 520a, 520b, 520c may also be manually rotated or adjusted by, for example, a user.

The rotor 512 may further comprise a protrusion 910. The protrusion 910 may extend from a surface of the rotor 512. The protrusion 910 may comprise at least one planar surface configured to receive at least one optical feature. For example, the optical feature may comprise reflective tape configured to be detected by an optical sensor. In some variations, the optical feature may comprise a hole, an indent, a depression, a section of color that contrasts with a surrounding color, or any other feature configured to be measured by an optical sensor.

Figure 10:
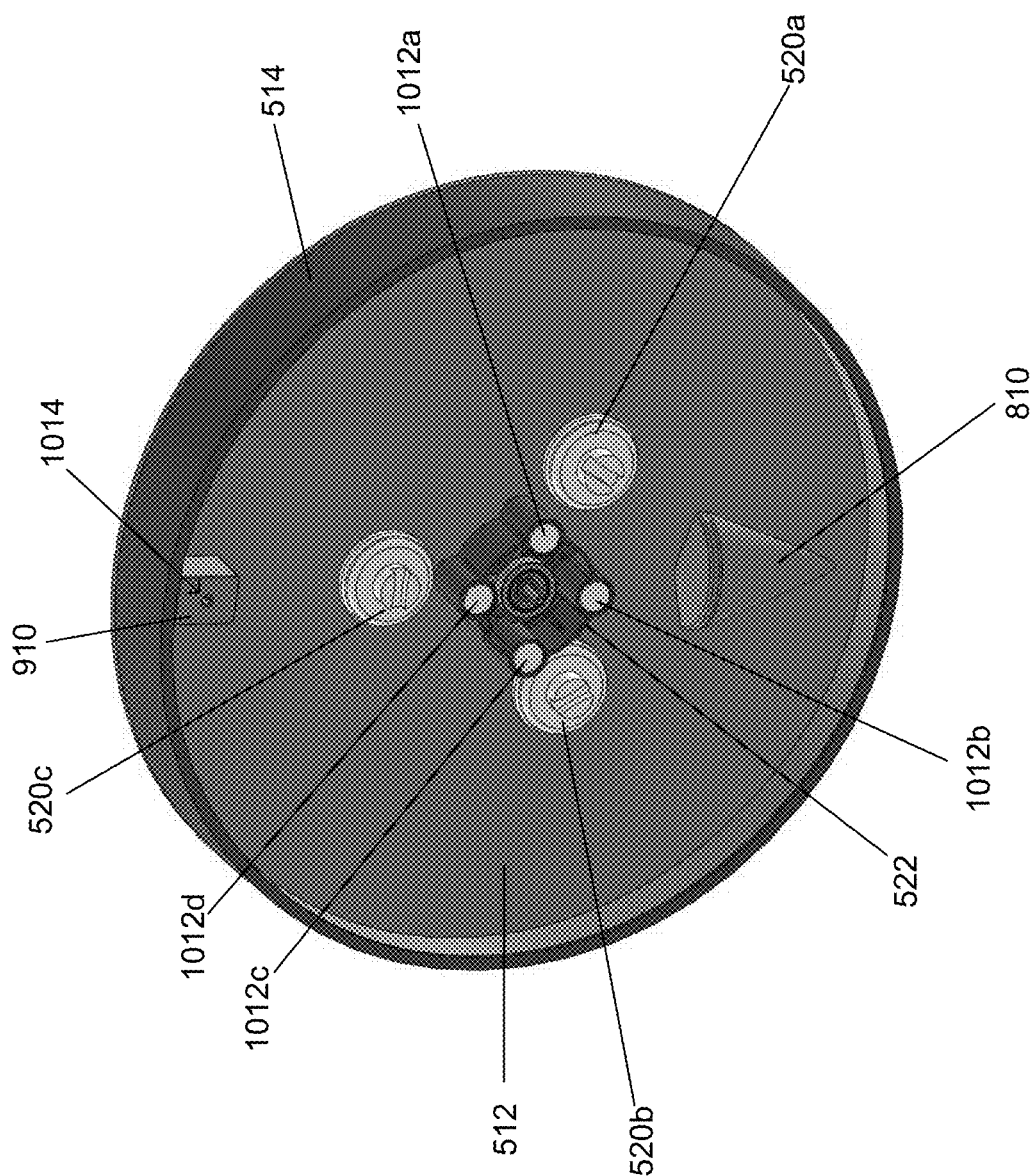
FIG. 10 is a rendering of a perspective view of an illustrative rotor of a module.

FIG. 10 provides a rendering of an illustrative embodiment of the rotor 512, elutriation chamber 516, and spinoculation chamber 514. The rotor 512 may further comprise a magnetic hub 522 comprising at least one magnet 1012. For example, the magnet 1012 may comprise a first magnet 1012a, a second magnet 1012b, a third magnet 1012c, and a fourth magnet 1012d. In some variations, the magnets 1012a, 1012b, 1012c, 1012d may comprise electromagnets. The magnets 1012a, 1012b, 1012c, 1012d may each receive an electrical signal sent by the controller 120. In some variations, the electrical signal received by each of the magnets 1012a, 1012b, 1012c, 1012d is substantially equivalent. In further variations, the electrical signals received by each of the magnets 1012a, 1012b, 1012c, 1012d is different. The rate of rotation of the rotor 512 may be controlled by the amplitude of the electrical signals transmitted to the magnets 1012a, 1012b, 1012c, 1012d. In some variations, the magnets 1012a, 1012b, 1012c, 1012d may comprise permanent magnets.

FIG. 10 provides an exemplary embodiment of the protrusion 910. The protrusion 910 may comprise an optical feature 1014 coupled to at least one surface of the protrusion 910. In some variations, the optical feature 1014 may comprise a feature configured to be measured by an optical sensor. For example, the optical feature 1014 may comprise a hole. In some variations, the optical feature 1014 may comprise a piece of reflective tape. The rate of rotation of the rotor 512 may be determined by the number of times the optical feature 1014 passes by the corresponding optical sensor in a specified unit of time.

Figure 11A:
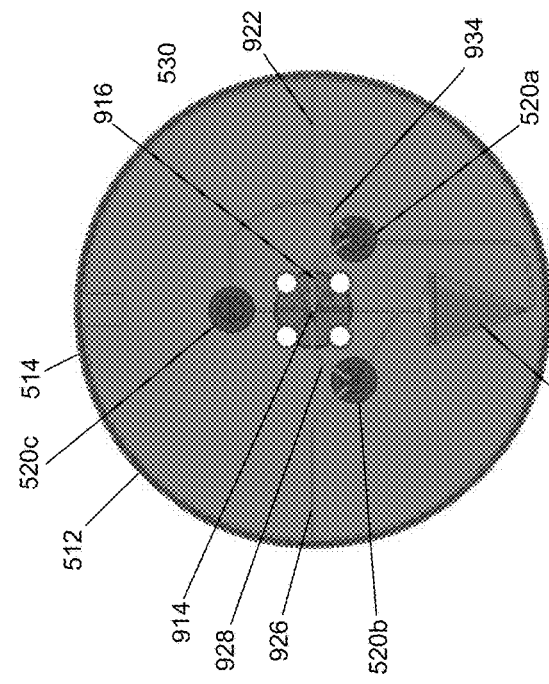
FIG. 11A, FIG. 11B, and FIG. 11C are illustrative variations of fluid flow paths through a rotor of a module.
Figure 11C:
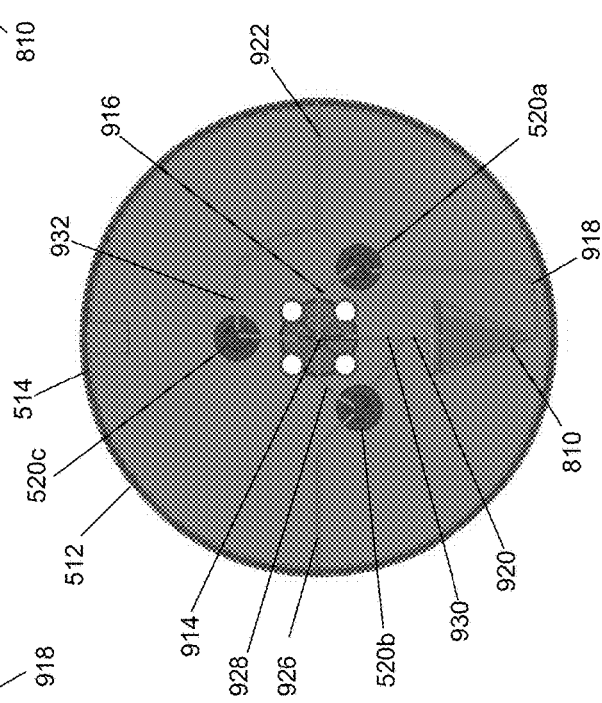
Figure 11B:
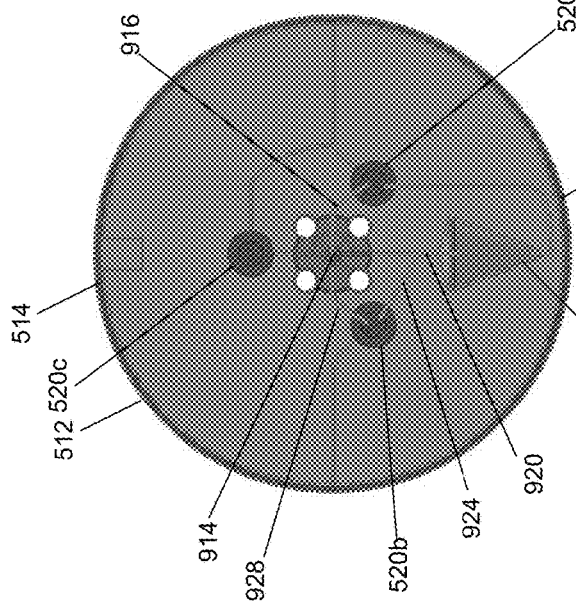

FIG. 11A, FIG. 11B, and FIG. 11C provide illustrative variations of flow paths through the rotor 512. The fluid may flow through any one of the selector valves 520 based on a selected cell process. The fluid may comprise one or more a cell solution, buffer, apheresis product, cleaning agent, or combination thereof. The selector valves may be adjusted into any one of three configuration. In a first configuration, shown in FIG. 11A, each of the selector valves 520a, 520b, 520c may be in a CCW position. The flow of fluid through the rotor while the selector valves 520 are in the first configuration and the rotor 512 is rotating may perform a counterflow centrifugal elutriation process. The first configuration may be referred to as an elutriation mode. In the first configuration, fluid may flow through the fluid opening 914 in a housing 510 (not shown). Then, fluid may flow along the flow path 916 to the selector valve 520a, through the selector valve 520a, and further along a flow path 918. Flow path 918 may fluidically connect selector valve 520a to the elutriation chamber 810. In some variations, an amount of fluid and/or cells may collect within the elutriation chamber 810. In some variations, fluid may flow from the elutriation chamber 810 and into a flow path 920. Flow path 920 may then fork into two or more flow paths. The two or more flow paths may comprise a flow path 924 and a flow path 930. With the selector valves in the first configuration, fluid may flow along flow path 920 and into flow path 924. Then, fluid may flow along flow path 924 and through selector valve 520b. Fluid may then flow from selector valve 520b along flow path 928. In some variations, flow path 928 may fluidically connect to the fluid opening 914. In this way, fluid may flow through the flow paths of the first configuration before exiting through the fluid opening 914. The fluid opening 914 may be fluidically connected to the liquid transfer bus. The fluid flow through the fluid opening 914 may be forward fluid flow or reverse fluid flow. In some variations, flow path 928 may fluidically connect to flow path 916. In this way, fluid may flow through the first selector valve 520a such that it is recycled in a continuous path.

In a second configuration, shown in FIG. 11B, the selector valves 520a and 520b may be in a CW position and selector valve 520c may be in a CCW position. The flow of fluid through the rotor 512 while the selector valves 520 are in the second configuration and the rotor 512 is rotating may perform a spinoculation process. The second configuration may be referred to as a spinoculation mode. In the second configuration, fluid may flow through the fluid opening 914 in a housing 510 (not shown). Then, fluid may flow along the flow path 916 to the selector valve 520a, through the selector valve 520a, and further along a flow path 922. Flow path 922 may fluidically connect selector valve 520a to the spinoculation chamber 514. In some variations, an amount of fluid and/or cells may collect within the spinoculation chamber 514. In some variations, fluid may flow from the spinoculation chamber 514 and into a flow path 926. Fluid may flow along flow path 926 and through selector valve 520b. Fluid may then flow from selector valve 520b along flow path 928. In some variations, flow path 928 may fluidically connect to the fluid opening 914. In this way, fluid may flow through the flow paths of the second configuration before exiting through the fluid opening 914. The fluid opening 914 may be fluidically connected to the liquid transfer bus. The fluid flow through the fluid opening 914 may be forward fluid flow or reverse fluid flow. In some variations, flow path 928 may fluidically connect to flow path 916. In this way, fluid may flow through the first selector valve 520a such that it is recycled in a continuous path.

In a third configuration, shown in FIG. 11C, the selector valves 520a and 520b may be in a CCW position and selector valve 520c may be in a CW position. The flow of fluid through the rotor 512 while the selector valves are in the third configuration may perform an elutriation process and a spinoculation process in series. For example, a volume of fluid may flow through the rotor 512 to perform an elutriation process followed by a spinoculation process. The third configuration may be referred to as a lysis-free mode.

In the third configuration, fluid may flow through the fluid opening 914 in a housing 510 (not shown). Then, fluid may flow along the flow path 916 to the selector valve 520a, through the selector valve 520a, and further along a flow path 918. Flow path 918 may fluidically connect selector valve 520a to the elutriation chamber 810. In some variations, an amount of fluid may collect within the elutriation chamber 810. In some variations, fluid may flow from the elutriation chamber 810 and into a flow path 920. Flow path 920 may then fork into two or more flow paths. The two or more flow paths may comprise a flow path 924 and a flow path 930. With the selector valves in the third configuration, fluid may flow along flow path 920 and into flow path 930. Then, fluid may flow along flow path 930, which is routed around the fluid opening 914, and to selector valve 520c. Fluid may then flow from selector valve 520c along flow path 932. Flow path 932 may fluidically connect to the spinoculation chamber 514. In some variations, fluid may flow from the spinoculation chamber 514 and into a flow path 926. Fluid may flow along flow path 926 and through selector valve 520b. Fluid may then flow from selector valve 520b along flow path 928. In some variations, flow path 928 may fluidically connect to the fluid opening 914. In this way, fluid may flow one time through the flow paths of the third configuration before exiting through the fluid opening 914. The fluid opening 914 may be fluidically connected to the liquid transfer bus. The fluid flow through the fluid opening 914 may be forward fluid flow or reverse fluid flow. In some variations, fluid channel 928 may fluidically connect to fluid channel 916. In this way, fluid may pass through the first selector valve 520a such that it is recycled in a continuous path.

In the third configuration, a buffer may be circulated through the rotor and subsequently recirculated. For example, in the lysis free mode, certain cell types or particulates within the fluid may be first captured within the elutriation chamber. Meanwhile, red blood cells may be pushed out from the elutriation chamber and subsequently captured in the spinoculation chamber. This process occurs while circulating and recirculating the buffer. The combined process advantageously reuses fluid (e.g., buffer) rather than requiring a continuous supply of fresh fluid.

II. Methods of Cell Processing

Generally, the systems and devices described herein may perform one or more cell processing steps. FIG. 12A and FIG. 12B are flowcharts of illustrative methods of cell processing that can be performed via the systems and devices described above. In FIG. 12A, the method 1201 may comprise performing a cell processing step within a module of a cartridge. The method 1201 may include transferring a cartridge 114 within a workcell 110 in a step 1210. For example, the cartridge 114 may be removed from a reagent vault 226 by a robot 116 and subsequently moved to one or more instruments within the workcell 110. In some variations, the instrument may be a spinoculation instrument 230. In further variations, the instrument may be a cell separation instrument 216 (e.g., magnetic separation instrument), an electroporation instrument 220, a counterflow centrifugation elutriation (CCE) instrument 222, or combinations thereof. In a step 1211, cells may be transferred from a liquid transfer bus 322 to a module of the cartridge 114. For example, a command may be sent by the controller 120 to the liquid transfer bus 322 to open at least one valve and begin flow of a fluid therefrom. In some variations, the module may comprise the module 310. In further variations, the module may comprise a bioreactor module 318, an electroporation module 320, a magnetic selection module 324, or an auxiliary module 326. Then, in a step 1214, a cell processing step may be performed within the module. For example, the cell processing step may comprise one or more spinoculation, elutriation, magnetic cell separation, electroporation, and any other cell process. Cells may then be transferred from the module to the liquid transfer bus 322 in a step 1216. For example, cells may flow along at least one flow path from the module to the liquid transfer bus 322. Cells may flow through at least one valve of the liquid transfer bus 322. The valve status may be controlled by the controller 120.

In FIG. 12B, the method 1202 may comprise performing a cell processing step within a sub-module of a module of a cartridge. The method 1202 may include transferring a cartridge 114 within a workcell 110 in a step 1210. For example, the cartridge 114 may be removed from a reagent vault 226 by a robot 116 and subsequently moved to one or more instruments within the workcell 110. In some variations, the instrument may be a spinoculation instrument 230. In further variations, the instrument may be a cell separation instrument 216 (e.g., magnetic separation instrument), an electroporation instrument 220, or a counterflow centrifugation elutriation (CCE) instrument 222, or combinations thereof. In a step 1212, cells may be transferred from a liquid transfer bus 322 to a sub-module of the cartridge 114. For example, a command may be sent by the controller 120 to the liquid transfer bus 322 to open at least one valve and begin flow of a fluid therefrom. In some variations, the sub-module may comprise a sub-module 314 of the module 310. The sub-module 314 may comprise a spinoculation sub-module. In some variations, the sub-module may comprise a sub-module 316 of the module 310. The sub-module 314 may comprise an elutriation sub-module. Then, in a step 1218, a cell processing step may be performed within the sub-module. For example, the cell processing step may comprise spinoculation within the spinoculation sub-module 314. Alternatively, in a step 1220, a cell processing step may be performed within the sub-module. For example, the cell processing step may comprise elutriation within the elutriation sub-module 316. Cells may then be transferred from the module to the liquid transfer bus 322 in a step 1216. Cells may flow through at least one valve of the liquid transfer bus 322. The valve status may be controlled by the controller 120.

FIG. 13A and FIG. 13B are flowcharts of illustrative methods of cell processing that can be performed via the systems and devices described above. In FIG. 13A, the method 1301 may comprise circulating a buffer while performing a cell processing step. The method 1301 may include transferring a cartridge within a workcell in a step 1210. For example, the cartridge 114 may be removed from a reagent vault 226 by a robot 116 and subsequently moved to one or more instruments within the workcell 110. In some variations, the instrument may be a spinoculation instrument 230. In further variations, the instrument may be a cell separation instrument 216 (e.g., magnetic separation instrument), an electroporation instrument 220, a counterflow centrifugation elutriation (CCE) instrument 222, or combinations thereof. In a step 1212, cells may be transferred from a liquid transfer bus 322 to a sub-module of the cartridge 310. For example, a command may be sent by the controller 120 to the liquid transfer bus 322 to open at least one valve and begin flow of a fluid therefrom. In some variations, the sub-module may comprise a sub-module 314 of the module 310. The sub-module 314 may comprise a spinoculation sub-module. In some variations, the sub-module may comprise a sub-module 316 of the module 310. The sub-module 314 may comprise an elutriation sub-module. Then, a buffer may begin to circulate through at least one sub-module in a step 1310. For example, the buffer may flow from the liquid transfer bus 322, flow through a fluid opening 526 of the module 310, and through at least one of the sub-modules 314, 316. While the buffer is circulating, a spinoculation process may be performed in a step 1312. For example, the spinoculation process may be performed within the spinoculation sub-module 314. Alternatively, while the buffer is circulating, an elutriation process may be performed in a step 1314. For example, the elutriation process may be performed within the elutriation sub-module 316. Subsequently, cells may be transferred from the module to the liquid transfer bus 322 in a step 1216. Cells may flow through at least one valve of the liquid transfer bus 322. The valve status may be controlled by the controller 120. In some variations, the buffer may also flow through at least one valve of the liquid transfer bus 322.

In FIG. 13B, the method 1302 may comprise performing cell processing steps while recirculating a buffer. The method 1302 may include transferring a cartridge within a workcell in a step 1210. For example, the cartridge 114 may be removed from a reagent vault 226 by a robot 116 and subsequently moved to one or more instruments within the workcell 110. In some variations, the instrument may be a spinoculation instrument 230. In further variations, the instrument may be a cell separation instrument 216 (e.g., magnetic separation instrument), an electroporation instrument 220, a counterflow centrifugation elutriation (CCE) instrument 222, or combinations thereof. In a step 1212, cells may be transferred from a liquid transfer bus 322 to a sub-module of the cartridge 310. For example, a command may be sent by the controller 120 to the liquid transfer bus 322 to open at least one valve and begin flow of a fluid therefrom. In some variations, the sub-module may comprise a sub-module 314 of the module 310. The sub-module 314 may comprise a spinoculation sub-module. In some variations, the sub-module may comprise a sub-module 316 of the module 310. The sub-module 314 may comprise an elutriation sub-module. Then, a buffer may begin to circulate through at least one sub-module in a step 1310. For example, the buffer may flow from the liquid transfer bus 322, flow through a fluid opening 526 of the module 310, and through at least one of the sub-modules 314, 316. In a step 1318, the buffer may be recirculated through at least one of sub-module. For example, at least one valve of the liquid transfer bus 322 may be closed in response to a command sent by the controller 120. The closed valve of the liquid transfer bus 322 may prevent buffer from exiting the module 310. There may be at least one fluid path along which the buffer may recirculate through the at least one sub-module. While the buffer is recirculating, a spinoculation process may be performed in a step 1312. For example, the spinoculation process may be performed within the spinoculation sub-module 314. Additionally, while the buffer is recirculating, an elutriation process may be performed in a step 1314. For example, the elutriation process may be performed within the elutriation sub-module 316. Subsequently, cells may be transferred from the module to the liquid transfer bus 322 in a step 1216. Cells may flow through at least one valve of the liquid transfer bus 322. The valve status may be controlled by the controller 120. In some variations, the buffer may also flow through at least one valve of the liquid transfer bus 322.

FIG. 14A, FIG. 14B, and FIG. 14C are flowcharts of illustrative methods of cell processing that can be performed via the systems and devices described above. In FIG. 14A, a method 1401 may comprise performing a cell processing step after adjusting at least one selector valve. The method 1401 may include a cell processing step may be selected in a step 1410. For example, a user may select at least one cell processing step via the controller 120 of the workcell 110. In some variations, the user may select multiple cell processing steps. For example, the user may select one or more of elutriation and spinoculation. In some variations, the cartridge 114 may already be coupled to at least one instrument. For example, the cartridge may already be coupled to one or more of a spinoculation instrument and elutriation instrument. Based on the selected cell processing step, at least one selector valve may be adjusted in a step 1412. For example, the position of at least one selector valve 520 of a module 310 may correspond to at least one cell processing step. For example, the first configuration of the selector valves 520 may correspond to an elutriation process and the second configuration of the selector valves 520 may correspond to a spinoculation process. In some variations, the position of at least one selector valve 520 may not require adjustment if the selector valve 520 is already in the configuration required to perform the selected cell processing step. In further variations, adjustment of at least one selector valve 520 may be required to perform the selected cell processing step. For example, the gear 530 of the workcell 110 may rotate in response to the selected cell process. In turn, the rotation of gear 530 rotates the gear 528 of the module 310, which subsequently may adjust one or more selector valve 520.

Then, cells may be transferred from a liquid transfer bus through the at least one selector valve to a sub-module in a step 1414. For example, a command may be sent by the controller 120 to the liquid transfer bus 322 to open at least one valve and begin flow of a fluid therefrom. In some variations, the sub-module may comprise a sub-module 314 of the module 310. The sub-module 314 may comprise a spinoculation sub-module. In some variations, the sub-module may comprise a sub-module 316 of the module 310. The sub-module 314 may comprise an elutriation sub-module. A cell processing step may be performed in a step 1416. For example, the spinoculation process may be performed within the spinoculation sub-module 314. In another example, the elutriation process may be performed within the elutriation sub-module 316. Subsequently, cells may be transferred from the sub-module through at least one selector valve to the liquid transfer bus in a step 1418. Cells may flow through at least one valve of the liquid transfer bus 322. The valve status may be controlled by the controller 120.

In FIG. 14B, a method 1402 may comprise performing multiple cell process steps in series after adjusting at least one selector valve. The method 1402 may include a cell processing step may be selected in a step 1410. For example, a user may select at least one cell processing step via the controller 120 of the workcell 110. In some variations, the user may select multiple cell processing steps. For example, the user may select one or more of elutriation and spinoculation. In some variations, the cartridge 114 may already be coupled to at least one instrument. For example, the cartridge may already be coupled to one or more of a spinoculation instrument and elutriation instrument. Based on the selected cell processing step, at least one selector valve may be adjusted in a step 1412. For example, the position of at least one selector valve 520 of a module 310 may correspond to at least one cell processing step. For example, the first configuration of the selector valves 520 may correspond to an elutriation process, the second configuration of the selector valves 520 may correspond to a spinoculation process, and the third configuration of the selector valves 520 may correspond to an elutriation process and spinoculation process in series. In some variations, the position of at least one selector valve 520 may not require adjustment if the selector valve 520 is already in the configuration required to perform the selected cell processing step. In further variations, adjustment of at least one selector valve 520 may be required to perform the selected cell processing step. For example, the gear 530 of the workcell 110 may rotate in response to the selected cell process. In turn, the rotation of gear 530 rotates the gear 528 of the module 310, which subsequently may adjust one or more selector valve 520.

Then, cells may be transferred from a liquid transfer bus through the at least one selector valve to one or more sub-module in a step 1420. For example, a command may be sent by the controller 120 to the liquid transfer bus 322 to open at least one valve and begin flow of a fluid therefrom. In some variations, the sub-module may comprise a sub-module 314 of the module 310. The sub-module 314 may comprise a spinoculation sub-module. In some variations, the sub-module may comprise a sub-module 316 of the module 310. The sub-module 314 may comprise an elutriation sub-module. In some variations, the cells may be transferred from the liquid transfer bus 322 to both sub-modules 314, 316. Then, elutriation may be performed in a sub-module 316 in a step 1422. In some variations, spinoculation may be subsequently performed in a sub-module 314 in a step 1424. For example, the elutriation and spinoculation process steps may occur in series. Subsequently, cells may be transferred from the sub-modules 314, 316 through at least one selector valve to the liquid transfer bus in a step 1418. Cells may flow through at least one valve of the liquid transfer bus 322. The valve status may be controlled by the controller 120.

In FIG. 14C, a method 1403 may comprise performing multiple cell process steps in series after adjusting at least one selector valve and measuring at least one parameter of the module 310. The method 1402 may include a cell processing step may be selected in a step 1410. For example, a user may select at least one cell processing step via the controller 120 of the workcell 110. In some variations, the user may select multiple cell processing steps. For example, the user may select one or more of elutriation and spinoculation. In some variations, the cartridge 114 may already be coupled to at least one instrument. For example, the cartridge may already be coupled to one or more of a spinoculation instrument and elutriation instrument. Based on the selected cell processing step, at least one selector valve may be adjusted in a step 1412. For example, the position of at least one selector valve 520 of a module 310 may correspond to at least one cell processing step. For example, the first configuration of the selector valves 520 may correspond to an elutriation process, the second configuration of the selector valves 520 may correspond to a spinoculation process, and the third configuration of the selector valves 520 may correspond to an elutriation process and spinoculation process in series. In some variations, the position of at least one selector valve 520 may not require adjustment if the selector valve 520 is already in the configuration required to perform the selected cell processing step. In further variations, adjustment of at least one selector valve 520 may be required to perform the selected cell processing step. For example, the gear 530 of the workcell 110 may rotate in response to the selected cell process. In turn, the rotation of gear 530 rotates the gear 528 of the module 310, which subsequently may adjust one or more selector valve 520.

Then, cells may be transferred from a liquid transfer bus through the at least one selector valve to one or more sub-module in a step 1420. For example, a command may be sent by the controller 120 to the liquid transfer bus 322 to open at least one valve and begin flow of a fluid therefrom. In some variations, the sub-module may comprise a sub-module 314 of the module 310. The sub-module 314 may comprise a spinoculation sub-module. In some variations, the sub-module may comprise a sub-module 316 of the module 310. The sub-module 314 may comprise an elutriation sub-module. In some variations, the cells may be transferred from the liquid transfer bus 322 to both sub-modules 314, 316. Then, elutriation may be performed in a sub-module 316 in a step 1422. In some variations, spinoculation may be subsequently performed in a sub-module 314 in a step 1424. For example, the elutriation and spinoculation process steps may occur in series when the selector valves 520 are in the third configuration. The rate of rotation of the at least one sub-module may be measured in a step 1428. For example, the sensor 140*b* may be operatively coupled to the window 532*b* to measure an optical feature of the protrusion 910 as the protrusion 910 rotates past the sensor 140*b* to measure the rate of rotation. Imaging data of the elutriation chamber 516 of the elutriation sub-module 316 may be generated in a step 1430. For example, the sensor 140*a* may be operatively coupled to the window 532*a* to measure one or more of the quantity and position of cells within the elutriation chamber 516. Subsequently, cells may be transferred from the sub-modules 314, 316 through at least one selector valve to the liquid transfer bus in a step 1418. Cells may flow through at least one valve of the liquid transfer bus 322. The valve status may be controlled by the controller 120.

While described above as containing certain steps, it should be understood that the methods of cell processing may include any subset of cell processing steps in any suitable order.

All references cited are herein incorporated by reference in their entirety.

Throughout this application, the term "about" is used to indicate that a value includes the inherent variation of error for the device or the method being employed to determine the value, or the variation that exists among the samples being measured. Unless otherwise stated or otherwise evident from the context, the term "about" means within 10% above or below the reported numerical value (except where such number would exceed 100% of a possible value or go below 0%). When used in conjunction with a range or series of values, the term "about" applies to the endpoints of the range or each of the values enumerated in the series, unless otherwise indicated. As used in this application, the terms "about" and "approximately" are used as equivalents.

While embodiments of the present invention have been shown and described herein, those skilled in the art will understand that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A cartridge for processing cells in an automated system comprising:
   a liquid transfer bus;
   a module fluidically coupled to the liquid transfer bus, wherein the module comprises:
      a housing comprising a first portion and a second portion configured to couple together to form a cavity;
      a spinoculation sub-module; and
      an elutriation sub-module, wherein the spinoculation and elutriation sub-modules are enclosed within the cavity formed by the first and second portions of the housing; and
      a rotor comprising at least one integrated selector valve configured to direct fluid to at least one of the spinoculation and elutriation sub-modules.

2. The cartridge of claim 1, wherein the at least one selector valve comprises a first selector valve and a second selector valve.

3. The cartridge of claim 2, further comprising a third selector valve.

4. The cartridge of claim 3, wherein the first selector valve is adjustable to define a first fluid flow path, the second selector valve is adjustable to define a second fluid flow path, and the third selector valve is adjustable to define a third fluid flow path.

5. The cartridge of claim 4, wherein the first and second selector valves are adjustable to direct fluid to a spinoculation chamber of the spinoculation sub-module.

6. The cartridge of claim 4, wherein the first and second selector valves are adjustable to direct fluid to an elutriation chamber of the elutriation sub-module.

7. The cartridge of claim 4, wherein the first, second, and third selector valves are adjustable to direct fluid to an elutriation chamber of the elutriation sub-module and fluid to a spinoculation chamber of the spinoculation sub-module in series.

8. The cartridge of claim 1 further comprising a first fluid opening fluidically coupled to the at least one selector valve via at least one fluid channel.

9. The cartridge of claim 8, wherein the first fluid opening is fluidically coupled to the liquid transfer bus.

10. The cartridge of claim 1, wherein the spinoculation sub-module and the elutriation sub-module share the rotor.

11. The cartridge of claim 1, wherein the spinoculation sub-module comprises a spinoculation chamber having a first wall and a second wall that define a gap therebetween.

12. The cartridge of claim 1, wherein the elutriation sub-module comprises an elutriation chamber having an elutriation cone.

13. The cartridge of claim 1, wherein the at least one selector valve comprises a detent configured to prevent rotation of the at least one selector valve.

14. The cartridge of claim 1, wherein the rotor further comprises an optical feature configured to be detected by an optical sensor external to the cartridge.

15. A cartridge for processing cells in an automated system comprising:
- a liquid transfer bus; and
- a module comprising:
  - a spinoculation sub-module;
  - an elutriation sub-module; and
  - a rotor positioned between and shared by the spinoculation and elutriation sub-modules, wherein the rotor comprises at least one integrated selector valve configured to direct fluid to at least one of the spinoculation and the elutriation sub-modules.

16. The cartridge of claim 15, wherein the module further comprises a housing, and wherein the rotor, the spinoculation sub-module, and the elutriation sub-module are enclosed within a cavity formed by first and second portions of the housing.

17. The cartridge of claim 16, wherein the housing comprises at least one viewing window.

18. The cartridge of claim 15, wherein the at least one selector valve comprises first and second selector valves, each configured to selectively direct fluid to the spinoculation or elutriation sub-module.

19. The cartridge of claim 15, wherein the module further comprises a seal between the spinoculation sub-module and elutriation sub-module.

20. The cartridge of claim 19, wherein the seal comprises a first fluid opening and a second fluid opening, and wherein the first fluid opening is in fluid communication with the liquid transfer bus.

21. The cartridge of claim 20, wherein the second fluid opening is in fluid communication with the at least one selector valve.

22. The cartridge of claim 16 further comprising a magnetic hub for attaching the cartridge to a corresponding instrument within a cell processing workcell.

23. The cartridge of claim 15, wherein the at least one selector valve is adjustable between different positions to define different fluid flow paths through the rotor.

24. The cartridge of claim 15, wherein the at least one selector valve comprises a rotary valve.

\* \* \* \* \*